US009762919B2

(12) United States Patent
Cote et al.

(10) Patent No.: US 9,762,919 B2
(45) Date of Patent: Sep. 12, 2017

(54) CHROMA CACHE ARCHITECTURE IN BLOCK PROCESSING PIPELINES

(71) Applicant: Apple Inc., Cupertino, CA (US)

(72) Inventors: Guy Cote, San Jose, CA (US); Joseph P. Bratt, San Jose, CA (US); Timothy J. Millet, Mountain View, CA (US); Shing I. Kong, Berkeley, CA (US); Joseph J. Cheng, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 237 days.

(21) Appl. No.: 14/472,119

(22) Filed: Aug. 28, 2014

(65) Prior Publication Data

US 2016/0065973 A1    Mar. 3, 2016

(51) Int. Cl.
| | |
|---|---|
| *H04N 19/127* | (2014.01) |
| *H04N 19/176* | (2014.01) |
| *H04N 19/186* | (2014.01) |
| *H04N 19/423* | (2014.01) |
| *H04N 19/433* | (2014.01) |

(Continued)

(52) U.S. Cl.
CPC ........ *H04N 19/186* (2014.11); *G06F 12/00* (2013.01); *G06T 1/60* (2013.01); *H04N 19/127* (2014.11); *H04N 19/172* (2014.11); *H04N 19/176* (2014.11); *H04N 19/423* (2014.11); *H04N 19/433* (2014.11); *H04N 19/439* (2014.11)

(58) Field of Classification Search
None
See application file for complete search history.

(56) References Cited

U.S. PATENT DOCUMENTS

| 5,675,387 A | 10/1997 | Hoogenboom et al. |
| 8,189,678 B2* | 5/2012 | Valmiki .................. G06T 9/007 345/505 |

(Continued)

FOREIGN PATENT DOCUMENTS

| WO | 2008037113 | 4/2008 |
| WO | 2013067938 | 5/2013 |

(Continued)

OTHER PUBLICATIONS

Office Action from Taiwan Patent Application No. 104128225; Dated Apr. 22, 2016 (English Translation and Taiwan Version), Apple Inc., pp. 1-6.

(Continued)

*Primary Examiner* — Reza Aghevli
(74) *Attorney, Agent, or Firm* — Robert C. Kowert; Meyertons, Hood, Kivlin, Kowert & Goetzel, P.C.

(57) ABSTRACT

Methods and apparatus for caching reference data in a block processing pipeline. A cache may be implemented to which reference data corresponding to motion vectors for blocks being processed in the pipeline may be prefetched from memory. Prefetches for the motion vectors may be initiated one or more stages prior to a processing stage. Cache tags for the cache may be defined by the motion vectors. When a motion vector is received, the tags can be checked to determine if there are cache block(s) corresponding to the vector (cache hits) in the cache. Upon a cache miss, a cache block in the cache is selected according to a replacement policy, the respective tag is updated, and a prefetch (e.g., via DMA) for the respective reference data is issued.

20 Claims, 24 Drawing Sheets

(51) Int. Cl.
*G06F 12/00* (2006.01)
*H04N 19/42* (2014.01)
*H04N 19/172* (2014.01)
*G06T 1/60* (2006.01)

(56) References Cited

U.S. PATENT DOCUMENTS

| | | | |
|---|---|---|---|
| 8,681,873 | B2 | 3/2014 | Bivolarsky et al. |
| 8,705,630 | B2 | 4/2014 | Pappas et al. |
| 2006/0050976 | A1 | 3/2006 | Molloy |
| 2007/0189390 | A1 | 8/2007 | Pappas et al. |
| 2008/0285652 | A1* | 11/2008 | Oxman ............ H04N 19/61 375/240.16 |
| 2009/0296813 | A1 | 12/2009 | Garg et al. |
| 2010/0026697 | A1 | 2/2010 | Xiang et al. |
| 2010/0166073 | A1 | 7/2010 | Schmit et al. |
| 2010/0195730 | A1 | 8/2010 | Garg et al. |
| 2011/0206110 | A1* | 8/2011 | Bivolarsky ........ H04N 19/107 375/240.01 |
| 2011/0206117 | A1 | 8/2011 | Bivolarsky et al. |
| 2011/0261884 | A1 | 10/2011 | Rubinstein et al. |
| 2012/0081385 | A1 | 4/2012 | Cote et al. |
| 2013/0272413 | A1 | 10/2013 | Seregin et al. |
| 2013/0272421 | A1 | 10/2013 | Takano et al. |
| 2013/0301712 | A1 | 11/2013 | Hsieh et al. |
| 2013/0301742 | A1 | 11/2013 | Cheung et al. |
| 2014/0071146 | A1 | 3/2014 | Sanghvi et al. |
| 2015/0003525 | A1* | 1/2015 | Sasai ................ H04N 19/176 375/240.12 |
| 2015/0012708 | A1* | 1/2015 | Rubinstein ........ H04N 19/105 711/125 |
| 2015/0016543 | A1* | 1/2015 | Rapaka ............. H04N 19/597 375/240.25 |
| 2016/0050422 | A1* | 2/2016 | Rosewarne ........ H04N 19/105 375/240.12 |

FOREIGN PATENT DOCUMENTS

| | | |
|---|---|---|
| WO | 2014009864 | 1/2014 |
| WO | 2014054896 | 4/2014 |

OTHER PUBLICATIONS

U.S. Appl. No. 14/037,318, filed Sep. 25, 2013, Marc A. Schaub.
U.S. Appl. No. 14/039,804, filed Sep. 27, 2013, Mark P. Rygh.
U.S. Appl. No. 14/037,316, filed Sep. 25, 2013, Craig M. Okruhlica.
U.S. Appl. No. 14/039,820, filed Sep. 27, 2013, Guy Cote.
U.S. Appl. No. 14/039,764, filed Sep. 27, 2013, Timothy John Millet.
U.S. Appl. No. 14/037,313, filed Sep. 25, 2013, Joseph J. Cheng.
U.S. Appl. No. 14/039,729, filed Sep. 27, 2013, James E. Orr.
U.S. Appl. No. 14/037,310, filed Sep. 25, 2013, Guy Cote.
U.S. Appl. No. 14/334,614, filed Jul. 17, 2014, Jim C. Chou.
International Search Report and Written Opinion from PCT/US2015/045129, Date of mailing Feb. 17, 2016, Apple Inc., pp. 1-18.
Invitation to Pay Additional Fees from PCT/US2015/045129, Date of Mailing Dec. 11, 2015, Apple Inc., pp. 1-8.

\* cited by examiner register 1540
| 0 · · · MR · · · · ML · · · TL BR · · · · BL · · · · · TR · · · · (N-1) |
*FIG. 15A*
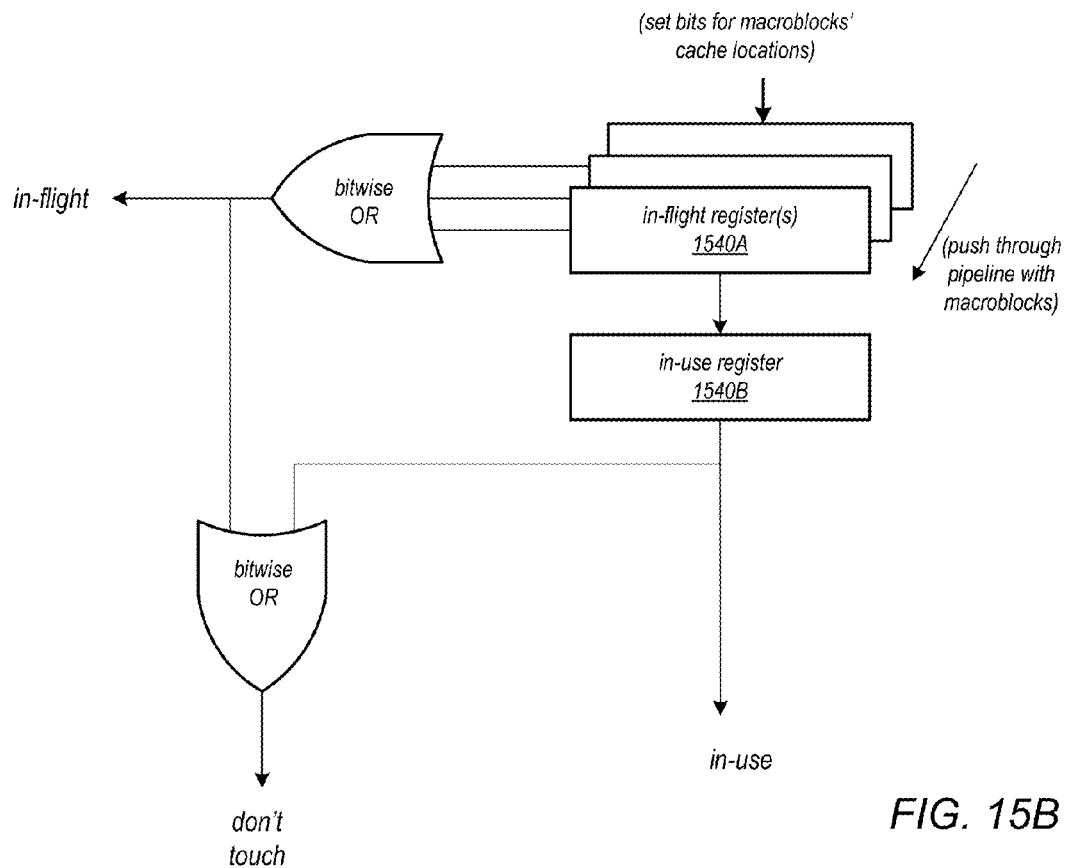
*FIG. 15B*
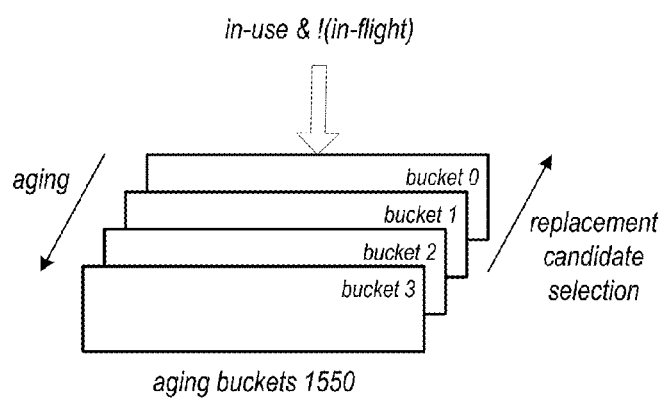
*FIG. 15C*

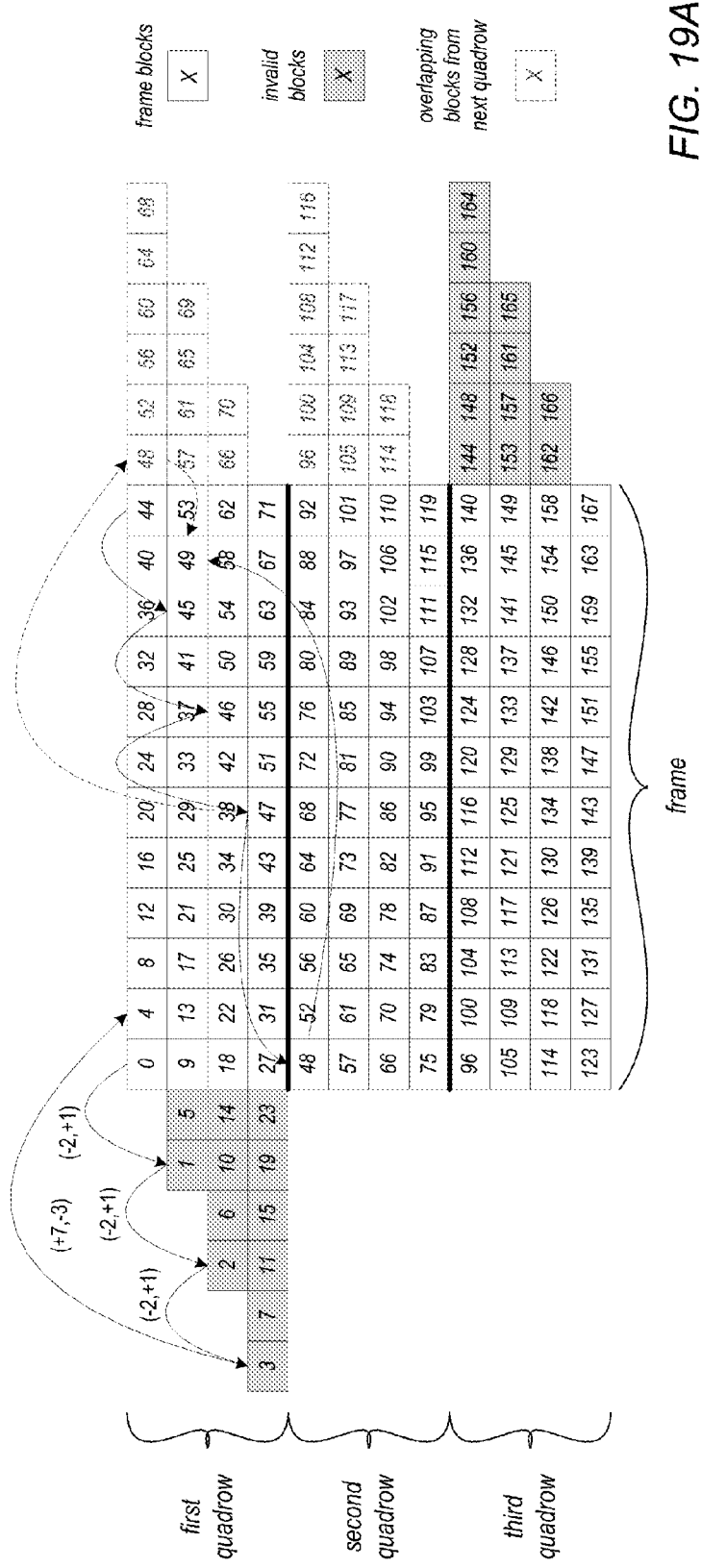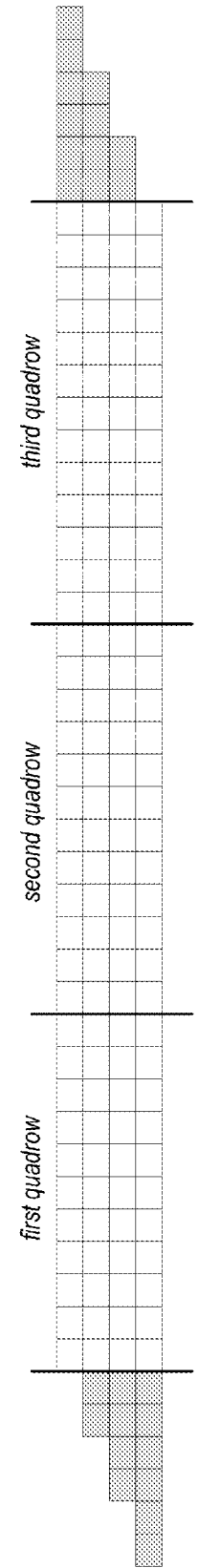
FIG. 19A
FIG. 19B

CHROMA CACHE ARCHITECTURE IN BLOCK PROCESSING PIPELINES

BACKGROUND

Technical Field

This disclosure relates generally to video or image processing, and more specifically to methods and apparatus for processing digital video frames in block processing pipelines.

Description of the Related Art

Various devices including but not limited to personal computer systems, desktop computer systems, laptop and notebook computers, tablet or pad devices, digital cameras, digital video recorders, and mobile phones or smart phones may include software and/or hardware that my implement a video processing method. For example, a device may include an apparatus (e.g., an integrated circuit (IC), such as a system-on-a-chip (SOC), or a subsystem of an IC), that may receive and process digital video input from one or more sources and output the processed video frames according to one or more video processing methods. As another example, a software program may be implemented on a device that may receive and process digital video input from one or more sources and output the processed video frames according to one or more video processing methods. As an example, a video encoder 10 as shown in FIG. 1 represents an apparatus, or alternatively a software program, in which digital video input (input frames 90) is encoded or converted into another format (output frames 92), for example a compressed video format such as H.264/Advanced Video Coding (AVC) format (also referred to as MPEG 4 Part 10), or H.265 High Efficiency Video Encoding (HEVC) format according to a video encoding method. An apparatus or software program such as a video encoder 10 may include multiple functional components or units, as well as external interfaces to, for example, video input sources and external memory.

In some video processing methods, to perform the processing, each input video frame 90 is divided into rows and columns of blocks of pixels (e.g., 16×16 pixel blocks), for example as illustrated in FIG. 2 which shows an example 192×192 pixel frame divided into 144 16×16 pixel blocks. Each block of an input video frame 90 is processed separately, and when done the processed blocks are combined to form the output video frame 92. This may be referred to as a block processing method. Conventionally, the blocks are processed by the block processing method in scan order as shown in FIG. 2, beginning at the first block of the first row of the frame (shown as block 0), sequentially processing the blocks across the row, and continuing at the first block of the next row when a row is complete.

A block processing method may include multiple processing steps or operations that are applied sequentially to each block in a video frame. To implement such a block processing method, an apparatus or software program such as a video encoder 10 may include or implement a block processing pipeline 40. A block processing pipeline 40 may include two or more stages, with each stage implementing one or more of the steps or operations of the block processing method. FIG. 1 shows an example video encoder 10 that implements an example block processing pipeline 40 that includes at least stages 42A through 42C. A block is input to a stage 42A of the pipeline 40, processed according to the operation(s) implemented by the stage 42A, and results are output to the next stage 42B (or as final output by the last stage 42). The next stage 42B processes the block, while a next block is input to the previous stage 42A for processing. Thus, blocks move down the pipeline from stage to stage, with each stage processing one block at a time and multiple stages concurrently processing different blocks. Conventionally, the blocks are input to and processed by the block processing pipeline 40 in scan order as shown in FIG. 2. For example, in FIG. 1, the first block of the first row of the frame shown in FIG. 2 (block 0) is at stage 42C, the second block (block 1) is at stage 42B, and the third block (block 2) is at stage 42A. The next block to be input to the block processing pipeline 40 will be the fourth block in the first row.

H.264/Advanced Video Coding (AVC)

H.264/AVC (formally referred to as ITU-T Recommendation H.264, and also referred to as MPEG-4 Part 10) is a block-oriented motion-compensation-based codec standard developed by the ITU-T (International Telecommunications Union-Telecommunication Standardization Sector) Video Coding Experts Group (VCEG) together with the ISO/IEC JTC1 Moving Picture Experts Group (MPEG). The H.264/AVC standard is published by ITU-T in a document titled "ITU-T Recommendation H.264: Advanced video coding for generic audiovisual services". This document may also be referred to as the H.264 Recommendation.

SUMMARY OF EMBODIMENTS

Various embodiments of methods and apparatus for caching chroma reference data in a block processing pipeline of a video encoder apparatus are described. In a video encoding block processing pipeline, chroma reference data from one or more frames that have been previously processed in the pipeline may be stored to a memory for access at one or more stages, for example for access at a chroma motion compensation stage, when processing macroblocks from a current frame. A cache memory (e.g., a fully associative cache) may be implemented, for example in a local (to the pipeline) memory such as SRAM (static random access memory), to which portions of the chroma reference data (e.g., 64-byte memory blocks) corresponding to motion vectors determined for macroblocks at earlier stages of the pipeline may be prefetched from the memory. Chroma cache logic may maintain the cache, and may extend over multiple stages of the pipeline. Fetches for the motion vectors of a given macroblock passing through the pipeline may be initiated by the chroma cache logic one or more stages prior to the chroma motion compensation stage to provide time (i.e., multiple pipeline cycles) to read the respective memory blocks from the memory into the cache before chroma motion compensation needs it.

In at least some embodiments, the chroma reference data may be stored in an external memory according to macroblock tile format(s), each tile including two or more blocks (e.g., 16×4 64B blocks), referred to herein as memory blocks, depending upon the chroma format. The chroma cache may include N (e.g. 512) locations or blocks (e.g., 64-byte blocks), referred to herein as cache blocks, into which the memory blocks may be prefetched. N cache tags may be used to reference the cache blocks in the chroma cache, with a one-to-one correspondence between the tags and the cache blocks. For each macroblock motion vector, one or more reference motion vectors are generated that each indicate the location of a memory block in the reference data that contains at least a portion of a chroma pixel region needed for the macroblock motion vector. The reference motion vectors may be used as read addresses (e.g., DMA read addresses) to prefetch the respective memory blocks from the reference data into cache blocks. The reference motion vectors are stored as the cache tags for respective cache blocks. Thus, the cache tags can be directly checked (without address translation) to determine if there is a cache block corresponding to a given reference motion vector (a cache hit) in the cache. Upon a cache miss, a cache block in the cache is selected according to a replacement policy, the respective tag is updated to indicate the reference motion vector, and a prefetch (e.g., via a DMA read request using the reference motion vector as a read address) for the respective memory block of chroma reference data indicated by the reference motion vector is issued. A status of the cache block may be marked as pending. When the memory block is read into the cache block, the cache block status may be changed to ready.

In at least some embodiments, the chroma cache logic may track the chroma cache blocks corresponding to the macroblocks that are at stages in the pipeline, for example using a set of N-bit registers. When cache blocks in the cache are determined for a macroblock, corresponding bits in a first register may be set. The contents of the register are pushed down through the stages of the pipeline with the macroblock. The one or more stages before the chroma motion compensation stage may be referred to as in-flight stages; a stage at which the cache blocks are accessed (e.g., a chroma motion compensation stage) may be referred to as an in-use stage. A logical operation (e.g., a bitwise OR) of the in-flight and in-use registers indicates to the chroma cache logic all of the cache blocks in the chroma cache that should not be selected as replacement cache blocks. These cache blocks may be referred to as "don't touch" cache blocks. When selecting cache blocks for cache misses according to the replacement policy, the current "don't touch" cache blocks are not used.

In the chroma cache replacement policy, an additional set of M registers may be used as "aging buckets" from which replacement candidates may be selected. For example four buckets (buckets 0-3) may be used. The buckets store indications of cache blocks that are not currently in the "don't touch" category. When done with a macroblock at a stage at which the cache blocks are accessed (e.g., the chroma motion compensation stage), the contents of the in-use register that are not also in the in-flight registers may be pushed into the first aging bucket (e.g., bucket 0). Logical operations may be used to push indications of available cache blocks through the buckets at pipeline cycles (every four cycles, in some embodiments), with bucket 0 being filled according to the in-flight and in-use register contents, bucket 1 filled according to the content of bucket 0, and so on. When selecting replacement candidate cache blocks, the last aging bucket (e.g., bucket 3) is checked first, then the next bucket (bucket 2), and so on. In at least some embodiments, more aging buckets may be added as needed.

BRIEF DESCRIPTION OF THE DRAWINGS

FIG. 15A illustrates a register that may be used to track cache blocks in a replacement policy, according to at least some embodiments.

FIG. 15B illustrates determining "don't touch" cache blocks, according to at least some embodiments.

FIG. 15C illustrates aging buckets, according to at least some embodiments.

FIGS. 19A and 19B graphically illustrate the knight's order processing method including the algorithm for determining a next block, according to at least some embodiments.

Figure 1:
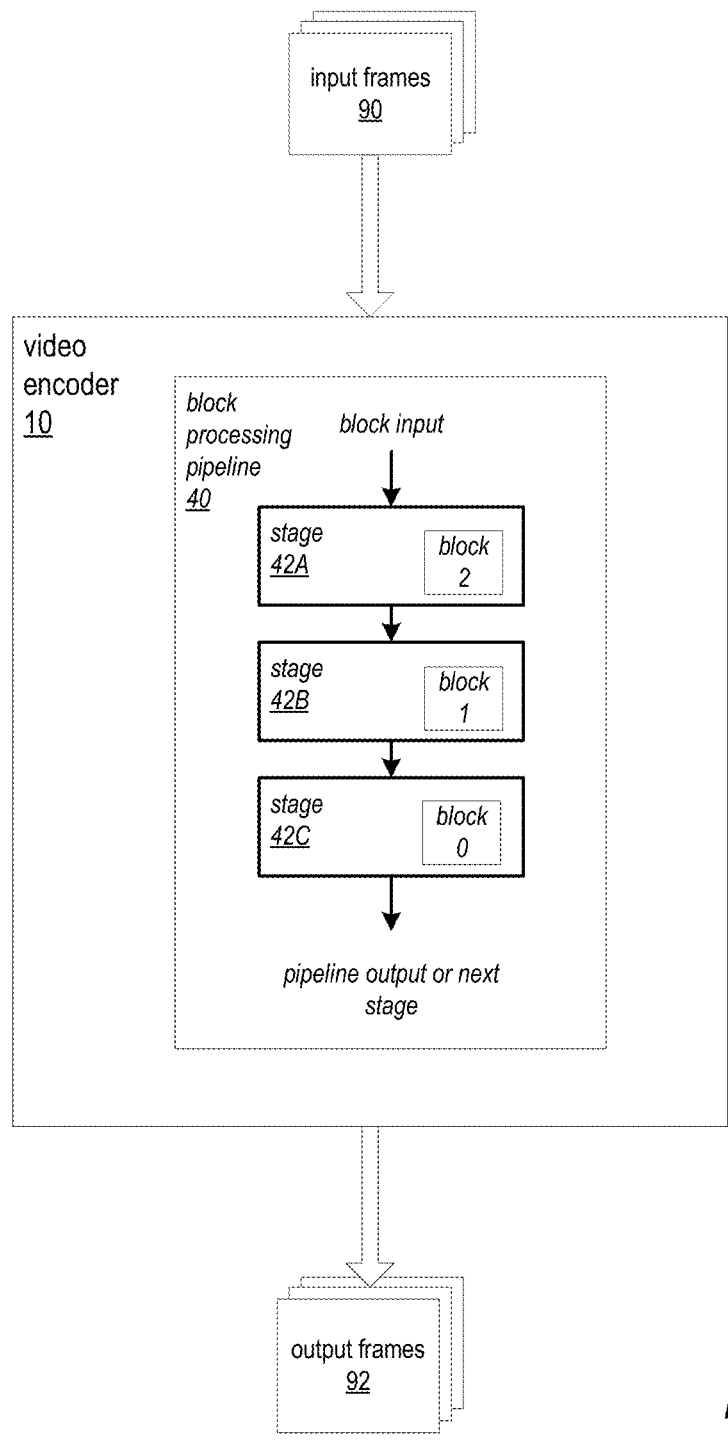
FIG. 1 illustrates an example video encoder including a conventional block processing pipeline that processes blocks from input frames in scan order.
Figure 2:
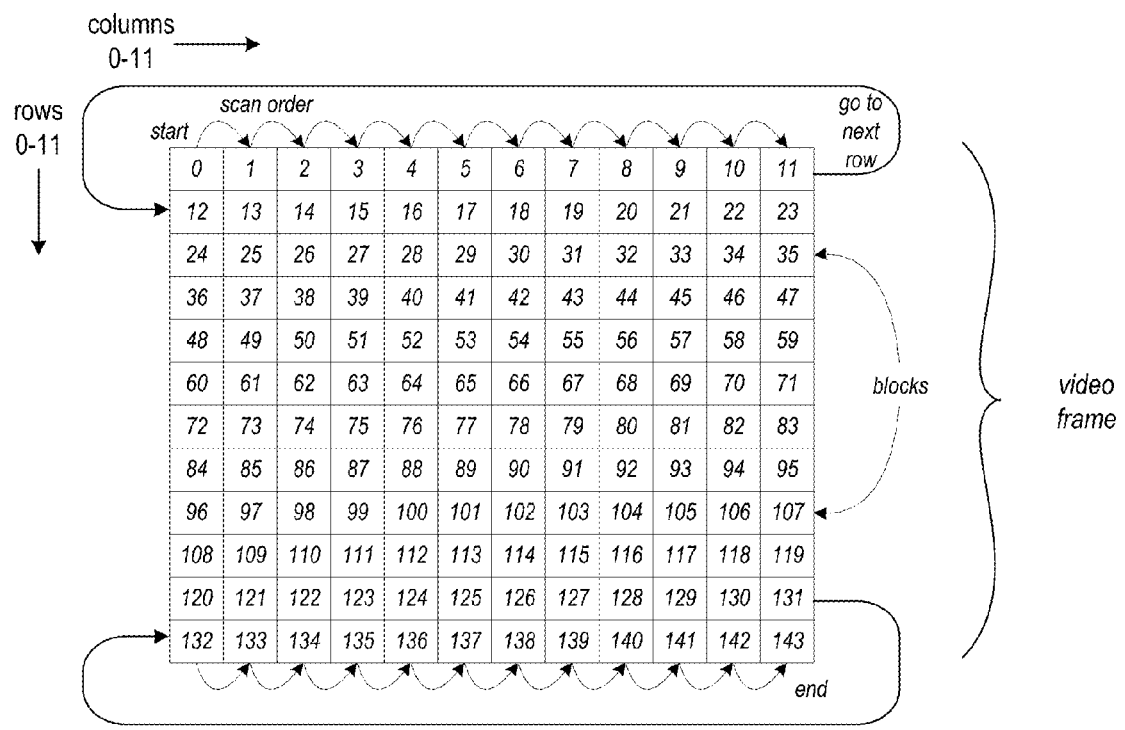
FIG. 2 illustrates conventional scan order processing of blocks from a video frame.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112(f) interpretation for that unit/circuit/component.

DETAILED DESCRIPTION

Figure 22:
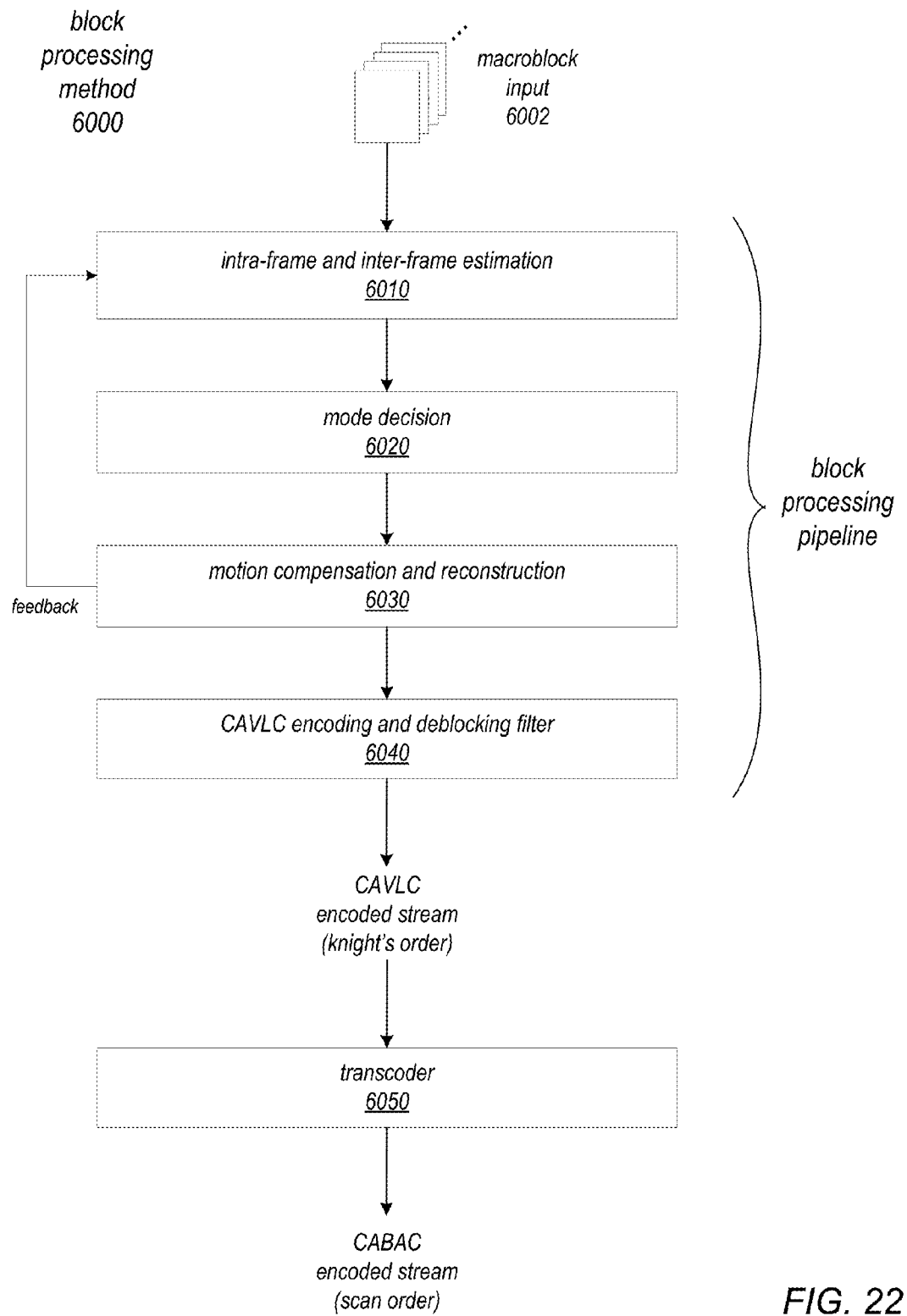
FIG. 22 is a high-level block diagram of general operations in an example block processing method that may be implemented by a block processing pipeline that implements one or more of the block processing methods and apparatus described herein, according to at least some embodiments.
Figure 23:
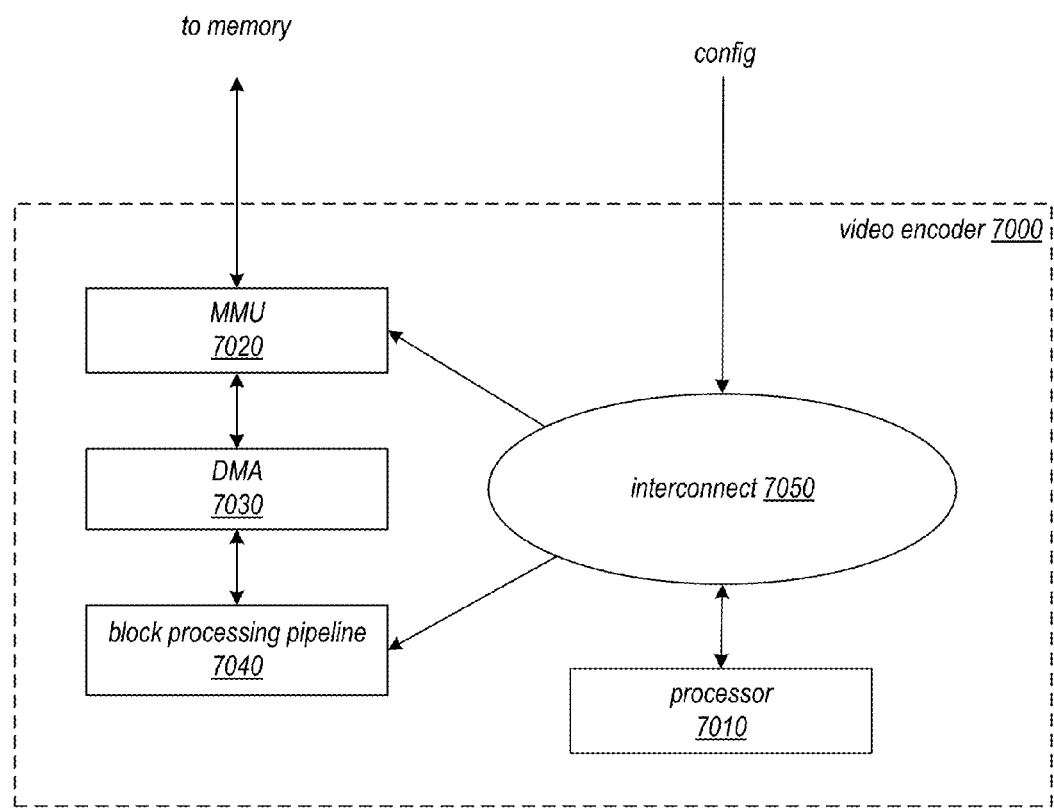
FIG. 23 is a block diagram of an example video encoder apparatus, according to at least some embodiments.

Various embodiments of methods and apparatus for processing digital video frames in block processing pipelines are described. Embodiments of block processing methods and apparatus are generally described herein in the context of video processing in which input video frames are subdivided into and processed according to blocks of elements (e.g., 16×16, 32×32, or 64×64 pixel blocks). Embodiments of an example H.264 video encoder that includes a block processing pipeline and that may implement one or more of the block processing methods and apparatus are described herein. The H.264 video encoder converts input video frames from an input format into H.264/Advanced Video Coding (AVC) format as described in the H.264/AVC standard (the H.264 Recommendation). FIG. 22 illustrates an example block processing pipeline of an example H.264 video encoder, and FIG. 23 illustrates an example H.264 video encoder that includes a block processing pipeline. However, embodiments of the block processing methods and apparatus may be used in encoders for other video encoding formats, for example in block processing pipelines of HEVC (High Efficiency Video Encoding) video encoders that convert input video frames from an input format into HEVC format as described in the HEVC standard. The HEVC standard is published by ITU-T in a document titled "ITU-T Recommendation H.265: High Efficiency Video Encoding". Other video encoders that may use embodiments of the block processing methods and apparatus may include, but are not limited to, H.263, MPEG-2, MPEG-4, and JPEG-2000 video encoders. However, it is to be noted that embodiments of the block processing methods and apparatus may be used in any block processing pipeline, including but not limited to block processing pipelines implemented in various other video encoders and/or decoders (which may be referred to as codecs) in which digital video frames input in one format are encoded or converted into another format. Further note that the block processing methods and apparatus may be used in software and/or hardware implementations of video encoders. In addition to video encoders/decoders, the block processing methods and apparatus described herein may be used in various other applications in which blocks from a video frame or still digital image are processed, for example in pipelines that process still digital images in various image processing applications. Thus, it is to be understood that the term frame or video frame as used herein may also be taken to refer to any digital image.

Embodiments of the block processing methods and apparatus as described herein may be implemented in two or more parallel block processing pipelines. For example, 2, 4, 8, or more pipelines may be configured to run in parallel, with each pipeline processing a quadrow from an input video frame, for example with blocks input according to a knight's order processing method as described herein Embodiments of the block processing methods and apparatus are generally described herein in the context of video processing in which input frames are subdivided into and processed according to blocks of picture elements (referred to as pixels, or pels), specifically 16×16 pixel blocks referred to as macroblocks that are used, for example, in H.264 encoding. However, embodiments may be applied in pipelines in which blocks of other sizes and geometries, or of other elements, are processed. For example, HEVC encoding uses blocks referred to as Coding Tree Units (CTUs) that may vary within the range of 16×16 pixel to 64×64 pixel. In some implementations such as H.264 encoders, the blocks input to the pipeline may be referred to as macroblocks, each macroblock including two or more blocks or partitions that may be processed separately at stages of the pipeline. For example, for input video frames encoded in YUV (e.g., YUV420 format) or YCbCr (e.g., YCbCr 4:2:0, 4:2:2 or 4:4:4 formats) color space, a macroblock may be composed of separate blocks of chroma and luma elements that may be processed separately at stages in a pipeline. In addition to applications that process frames in a pipeline according to blocks of elements (e.g., blocks of pixels), the block processing methods and apparatus may be applied in applications in which digital images (e.g., video frames or still images) are processed by single elements (e.g., single pixels).

Chroma Reference Data Storage in Block Processing Pipelines

In at least some embodiments, a block processing pipeline may store and access luma and chroma reference data from previously processed frames (reference frames) according to one or more macroblock tile formats based on a block request size of the memory system, for example 64 bytes.

Figure 3:
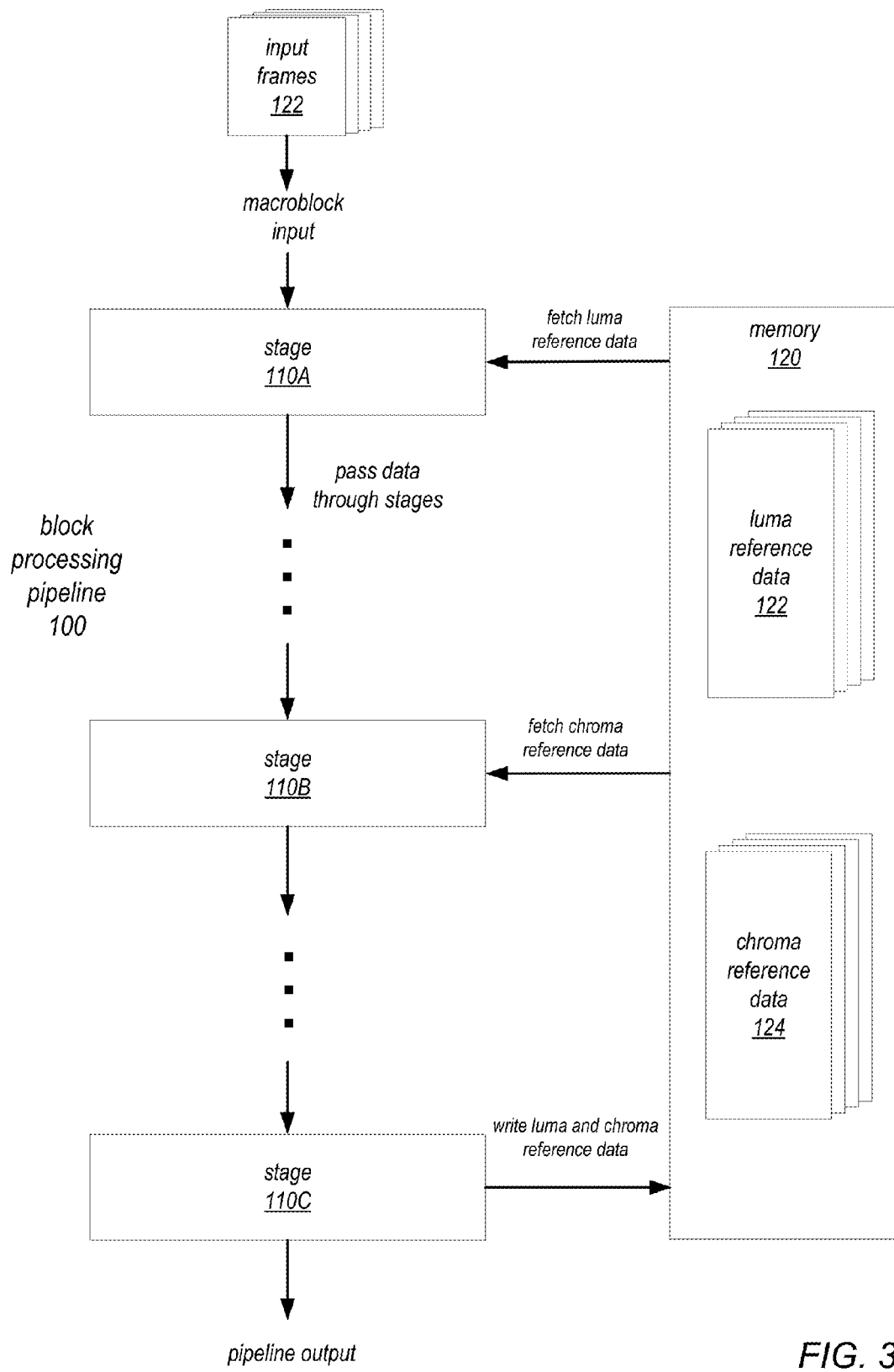
FIG. 3 illustrates an example block processing pipeline, according to at least some embodiments.

FIG. 3 illustrates an example block processing pipeline at a high level, according to at least some embodiments. A block processing pipeline 100 may obtain blocks of pixels from an input video frame and process each block at the stages 110 of the pipeline to generate an output video frame. In at least some embodiments, the block processing pipeline 100 may process the blocks of pixels from the input frame according to groups of rows (e.g., in row groups each containing four rows of blocks). In at least some embodiments, the block processing pipeline 100 may process blocks according to knight's order as described in the section titled Knight's order processing. In at least some embodiments, the input frames may be subdivided into and processed according to 16×16 pixel blocks referred to as macroblocks. In at least some embodiments, a macroblock may be composed of separate blocks of chroma and luma elements that may be processed separately at stages in the pipeline 100. The block processing pipeline 100 may process multiple input video frames to generate an output video stream. For example, an H.264 video encoder that includes a block processing pipeline as described herein may convert input video frames from an input format (e.g., 1080p (1920× 1080 pixels, 2.1 megapixels) encoded in YCbCr color space) into H.264/AVC format.

One or more stages 110 of the pipeline 100 may process the macroblocks from a current video frame according to reference data from one or more previously processed video frames (referred to as reference frames) obtained from a memory 120 system that stores the reference data. For example, in FIG. 3, stage 110A fetches luma reference data for processing luma components of macroblocks in the pipeline 100, and stage 110B fetches chroma reference data for processing chroma components of macroblocks in the pipeline 100. A stage 110 at or near the end of the pipeline 100 (e.g., stage 110C in FIG. 3) may store processed macroblocks of pixels from the current video frame to the memory 120 system to be used as reference data when processing subsequent video frames. In at least some embodiments, luma reference data 122 and chroma reference data 124 from the processed blocks of a frame may be stored as separate reference data to the memory 120 system.

Macroblock Tile Formats for Chroma Reference Data

In at least some embodiments, reference data from macroblocks that have been processed by the pipeline are stored to the memory according to one or more tile formats that may reduce or minimize memory accesses needed to fetch the reference data from the memory system when compared to storing the reference data in scan order. When the block processing pipeline stores reference data from a current frame being processed to memory as a reference frame, instead of writing the reference samples from the processed macroblocks to memory in sequential order across the frame, the reference samples are stored to memory in macroblock sequential order. Each macroblock sample set is stored as a tile. In at least some embodiments, reference data may be stored separately in tile formats for luma and chroma samples. In at least some embodiments, chroma reference data may be stored in tile formats for one or more of YCbCr 4:2:0, 4:2:2 or 4:4:4 formats. Example tile formats for each chroma format are illustrated in FIGS. 6 through 8.

In at least some embodiments of a block processing pipeline, when the block processing pipeline stores reference data from a current frame being processed to memory as a reference frame, instead of writing the reference samples from the processed macroblocks to memory in sequential order across the frame, the reference samples are stored to memory in macroblock sequential order. Each macroblock sample set is stored as a tile. Each tile may contain two or more 64-byte blocks of samples, which may be referred to herein as memory blocks. Each 64-byte memory block includes two or more sequential horizontal lines of samples from the respective macroblock. By storing the reference data in tile format instead of in scan order, fetching the reference data from a given macroblock in the reference frame can be performed by issuing four 64-byte read requests beginning at the start address for the macroblock. Each of the four reads returns 64 bytes of reference data from the given macroblock. Thus, fewer read requests are needed to fetch a given macroblock than would be needed if the reference data was stored in scan order, and each read is much more efficient as each read returns only reference data that is needed.

Figure 4:
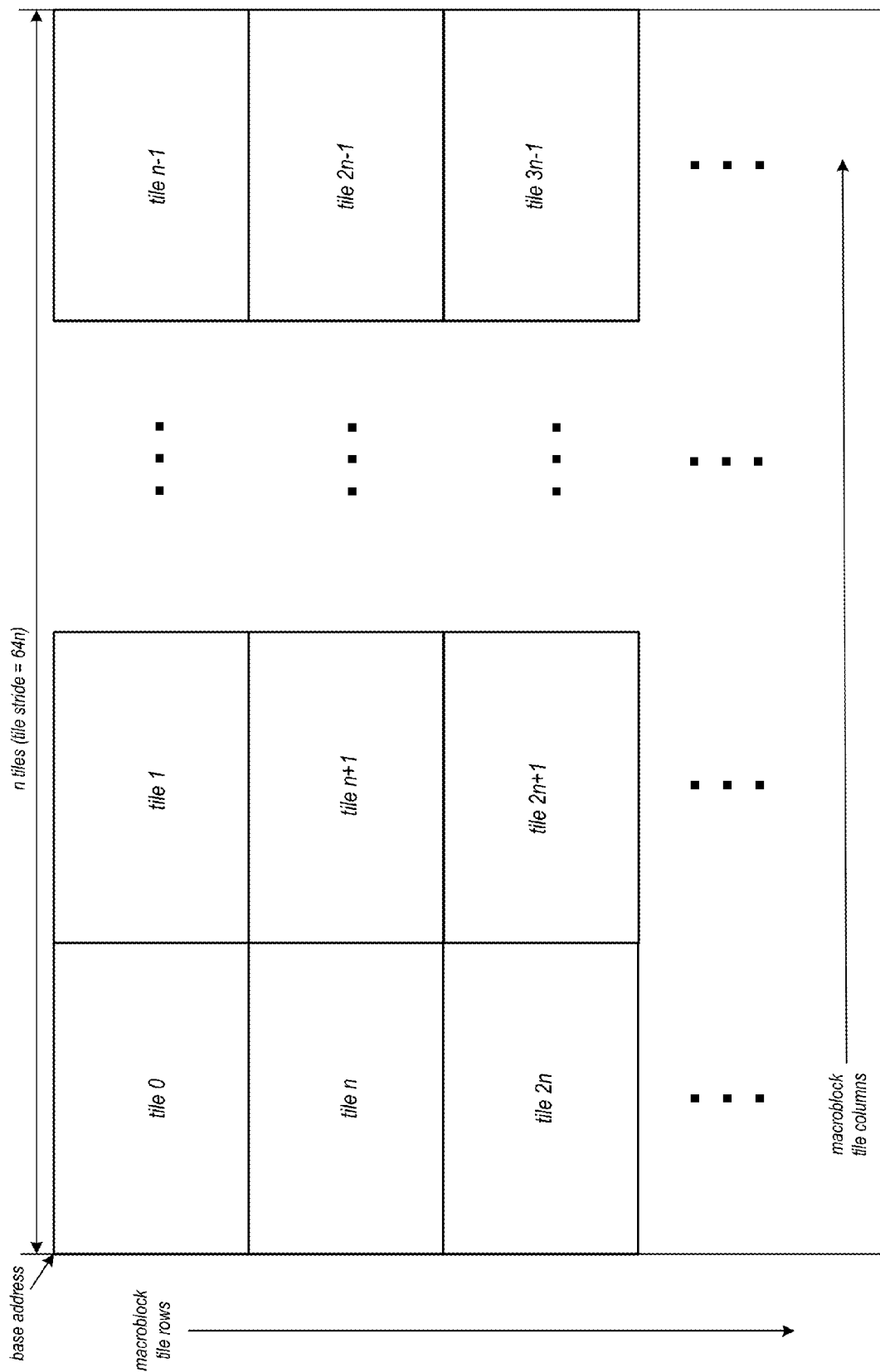
FIG. 4 graphically illustrates macroblock tile formats in memory for a video frame, according to at least some embodiments.

FIG. 4 graphically illustrates macroblock tile formats in memory for a video frame, according to at least some embodiments of a block processing pipeline. Each tile corresponds to a macroblock of the frame. Tile 0 corresponds to a first macroblock on a first row of the frame, and tile 1 corresponds to tile 0's right neighbor macroblock on the row. The frame is n tiles wide, tile n−1 corresponds to the last macroblock of the first row of the frame, tile n corresponds to the first macroblock on the second row of the frame, and tile 2*n* corresponds to the first macroblock on the third row of the frame. Each tile is composed of two or more contiguous block units (e.g., 64-byte blocks) according to the block request size of the memory system. The number of 64-byte block units in a tile depends on the tile type (luma type, or one of the chroma types illustrated in FIGS. 5 through 7). Tile stride specifies the distance in bytes between two vertically adjacent macroblocks, and is given by 64*n*. Reading linearly from memory from the base address, tile 0 would be read, followed by tile 1, and so on through the first row, continuing at tile n on the second row, and so on until the tile corresponding to the last macroblock of the frame is read.

Figure 5:
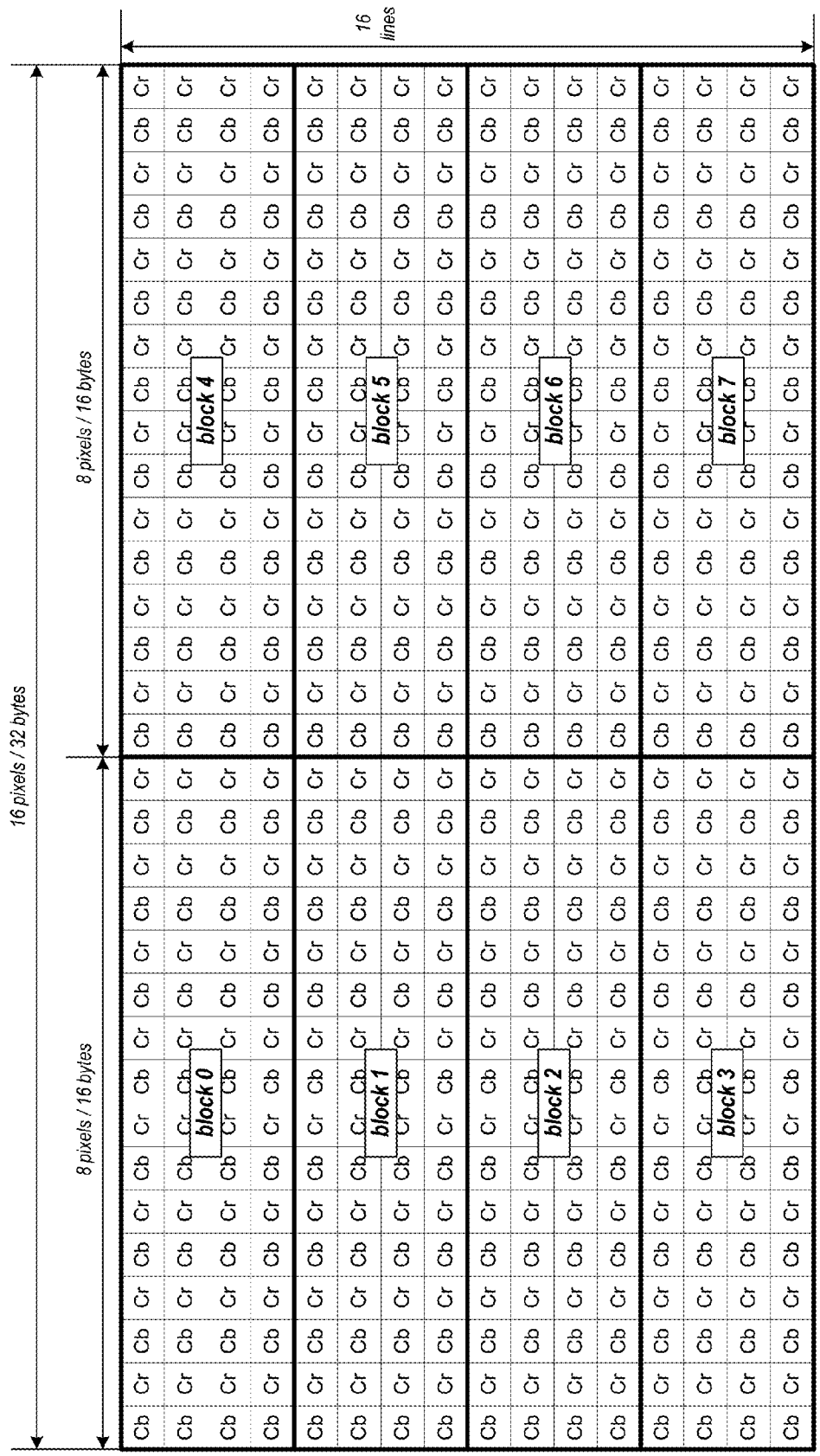
FIG. 5 graphically illustrates a tile format for chroma 4:4:4, according to at least some embodiments.
Figure 6:
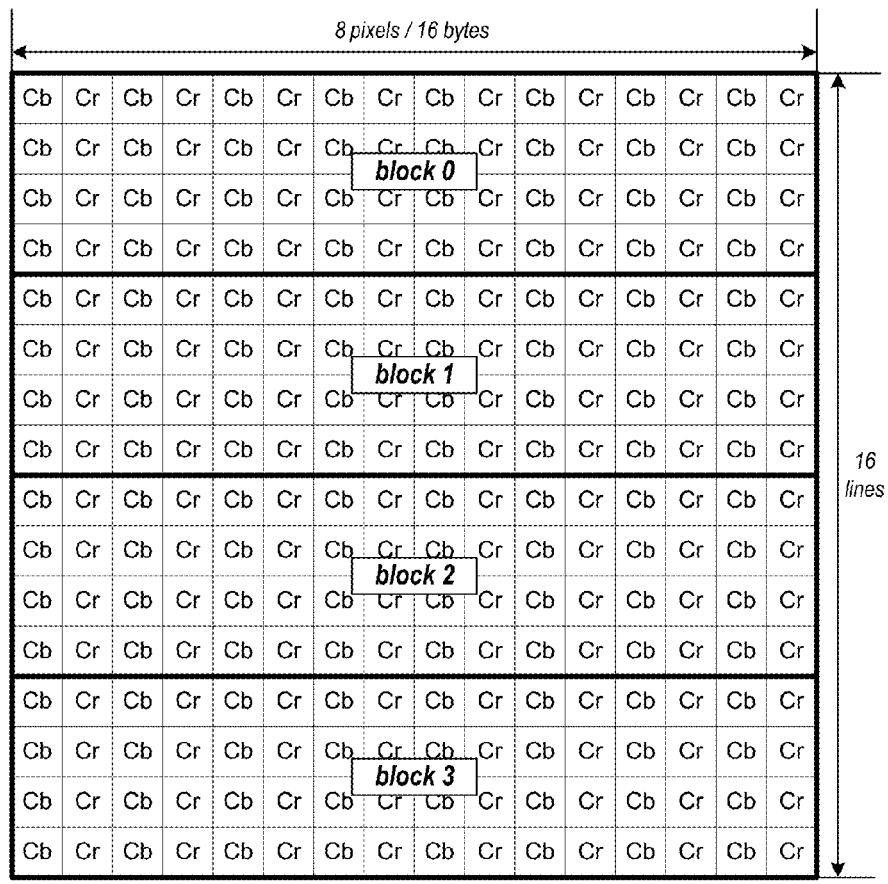
FIG. 6 graphically illustrates a tile format for chroma 4:2:2, according to at least some embodiments.
Figure 7:
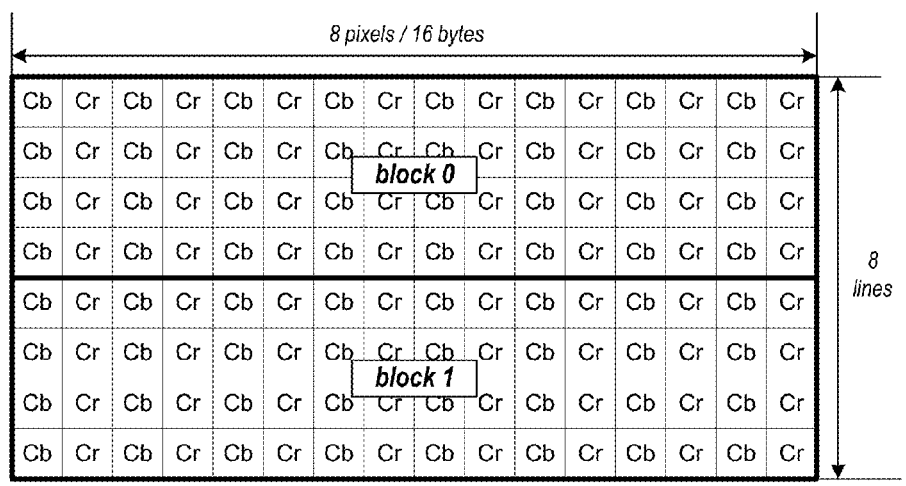
FIG. 7 graphically illustrates a tile format for chroma 4:2:0, according to at least some embodiments.
Figure 8:
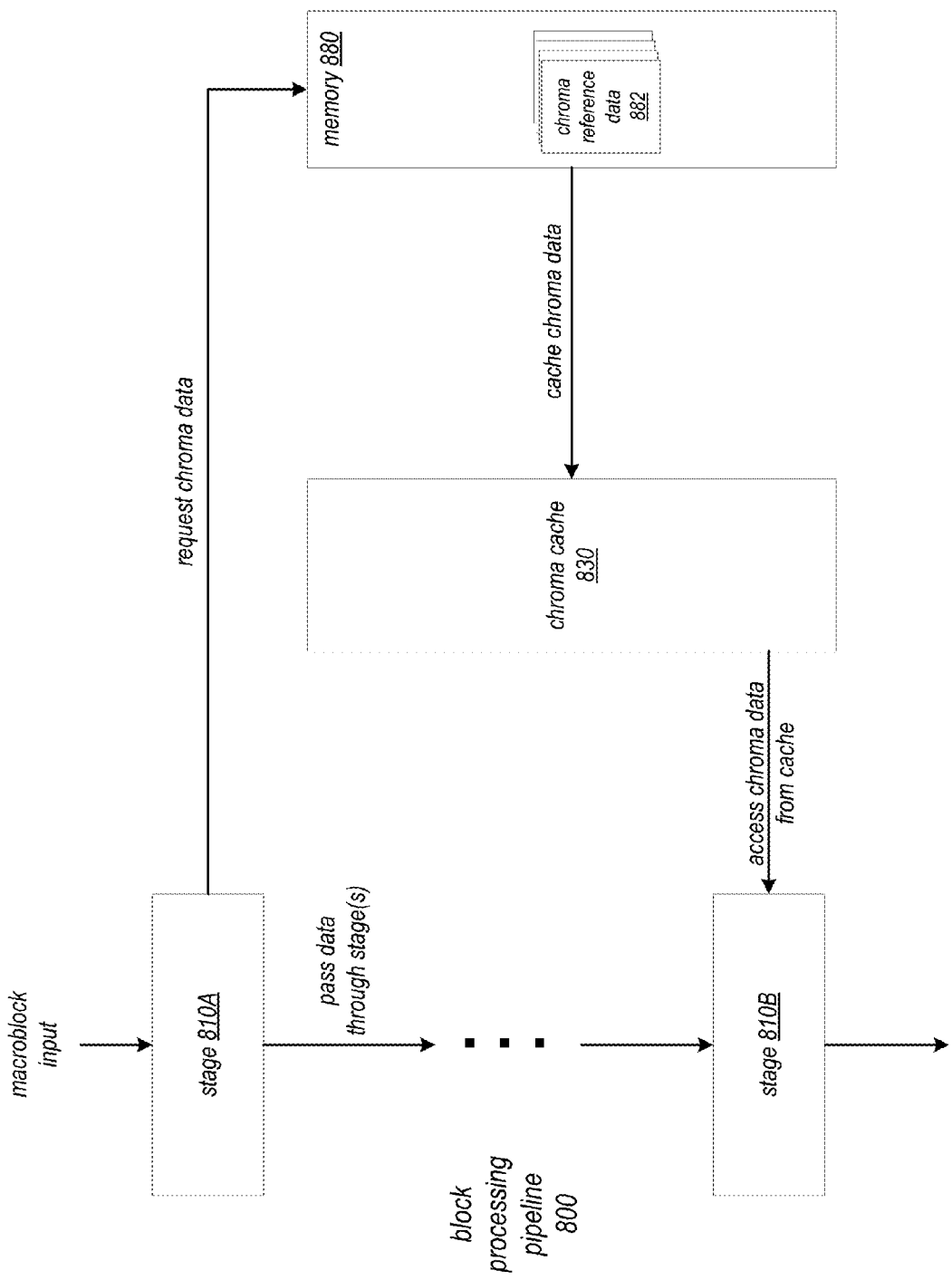
FIG. 8 illustrates an example block processing pipeline using a chroma cache, according to at least some embodiments.

FIGS. 5 through 7 graphically illustrate example tile formats for chroma, according to at least some embodiments. A full size chroma block is 8×8, 8×16, or 16×16 pixels for chroma formats 4:2:0, 4:2:2 and 4:4:4, respectively. However, each chroma pixel has a Cb (blue-difference) and a Cr (red-difference) chroma component. Thus, in chroma format, each pixel is represented by two bytes (Cb/Cr). Thus, tile sizes in bytes for chroma formats 4:2:0, 4:2:2 and 4:4:4 are 16×8, 16×16, and 32×16, respectively. As shown in FIGS. 5 through 7, the Cb and Cr components may be interleaved. FIG. 5 graphically illustrates a tile format for chroma 4:4:4, according to at least some embodiments. In chroma 4:4:4 tile format, each tile includes eight 16×4 64-byte blocks. Blocks 0-3 include the left eight columns of chroma pixels, while blocks 4-7 include the right eight columns of chroma pixels. Note that, in memory, blocks 0-7 may be arranged sequentially. FIG. 6 graphically illustrates a tile format for chroma 4:2:2, according to at least some embodiments. As shown in FIG. 6, in chroma 4:2:2 tile format, each tile includes four 16×4 64-byte blocks. FIG. 7 graphically illustrates a tile format for chroma 4:2:0, according to at least some embodiments. As shown in FIG. 7, in chroma 4:2:0 tile format, each tile includes two 16×4 64-byte blocks.

While embodiments are primarily described in reference to block processing pipelines that process 16×16 byte macroblocks and memory systems that support a block request size of 64 bytes, embodiments may be applied to pipelines that process blocks of other sizes (e.g., 6×16 pixel to 64×64 pixel Coding Tree Units (CTUs) as used in HEVC encoding) and/or that utilize memory systems with different block request sizes (e.g., 16 byte, 32 byte, 128 byte, 256 byte, etc.)

Chroma Cache Architecture for Block Processing Pipelines

Various embodiments of methods and apparatus for caching chroma reference data in a block processing pipeline of a video encoder apparatus are described. In at least some video encoders, blocks of pixels from a current video frame may be encoded at least in part using blocks of pixels from one or more previously encoded frames (referred to as reference frames). In at least some video encoders, one or more stages of the block processing pipeline may determine sets of best motion vectors for macroblocks passing through the pipeline that are passed to subsequent stages of the pipeline for performing motion compensation and reconstruction. For example, referring to FIG. 22, intra-frame and inter-frame estimation 6010 and mode decision 6020 may determine best motion vectors for macroblocks, and the motion vectors may be passed to motion compensation and reconstruction 6030 with the respective macroblocks. In many video encoding standards such as H.264 and H.265, various partition sizes (4×4, 8×4, 4×8, 8×8, 16×8, 8×16, 16×16, etc.) are allowed for motion compensation. The set of motion vectors for a macroblock may indicate locations of best matching regions of pixels in the one or more reference frames for one or more partitions of the macroblock.

In at least some embodiments of a block processing pipeline, the luma reference data may be accessed at upstream stage(s) of the pipeline to determine the best motion vectors for the macroblocks and to perform motion compensation and reconstruction for luma, and the chroma reference data may be accessed at downstream stage(s) of the pipeline to perform motion compensation and reconstruction for chroma. For example, referring to FIG. 22, intra-frame and inter-frame estimation 6010 and mode decision 6020 may determine best motion vectors for macroblocks according to luma reference data, and the motion vectors may be passed to motion compensation and reconstruction 6030, which uses the motion vectors to fetch indicated pixel data from the reference frame(s). Motion compensation and reconstruction 6030 may be subdivided into luma motion compensation and reconstruction performed at one or more stages of the pipeline, and chroma motion compensation and reconstruction performed at one or more subsequent or downstream stages of the pipeline. The luma motion compensation and reconstruction stage(s) may access the luma reference data according to the motion vectors, and the chroma motion compensation and reconstruction stage(s) may access the chroma reference data according to the motion vectors. In at least some embodiments, chroma motion compensation and reconstruction may be performed in two stages. In the first stage, chroma reference blocks (referred to as memory blocks) needed for inter prediction are read from memory based on input macroblock type, motion vectors, and reference frame index. Subpixel interpolation and weighted prediction is then applied to generate a prediction macroblock. In the second stage, chroma intra prediction and chroma intra/inter forward transform and quantization (FTQ), and/or inverse transform and quantization (ITQ) may be performed. In at least some embodiments, a chroma motion compensation component performs the first stage, while a chroma reconstruction component performs the second stage. This allows one additional pipeline stage to load chroma reference data. Since chroma reference pixels are not searched during motion estimation at intra-frame and inter-frame estimation 6010, the chroma reference data may be read from external (to the pipeline) memory, and thus may have large latency.

Accessing reference data from an external memory on an as-needed basis at stages of the pipeline may cause delays or stalls in the pipeline, as external memory accesses (e.g., DMA reads) may have large latency, and may be unpredictable as the external memory may be shared with other processes or components. Thus, embodiments of a block processing pipeline are described that include a local (internal to the pipeline) chroma cache memory into which chroma reference data for a macroblock may be fetched prior to the macroblock reaching the chroma motion compensation and reconstruction stage(s), and thus prior to the chroma motion compensation and reconstruction stage(s) accessing the chroma reference data for the macroblock. In some embodiments, for example, reads for the required chroma reference data for a given macroblock may be issued at or before a first stage of luma motion compensation and reconstruction. In embodiments where luma motion compensation and reconstruction is performed over two stages, this gives at least two pipeline cycles for the chroma reference data to be read from the external memory into the local chroma cache.

Figure 16:
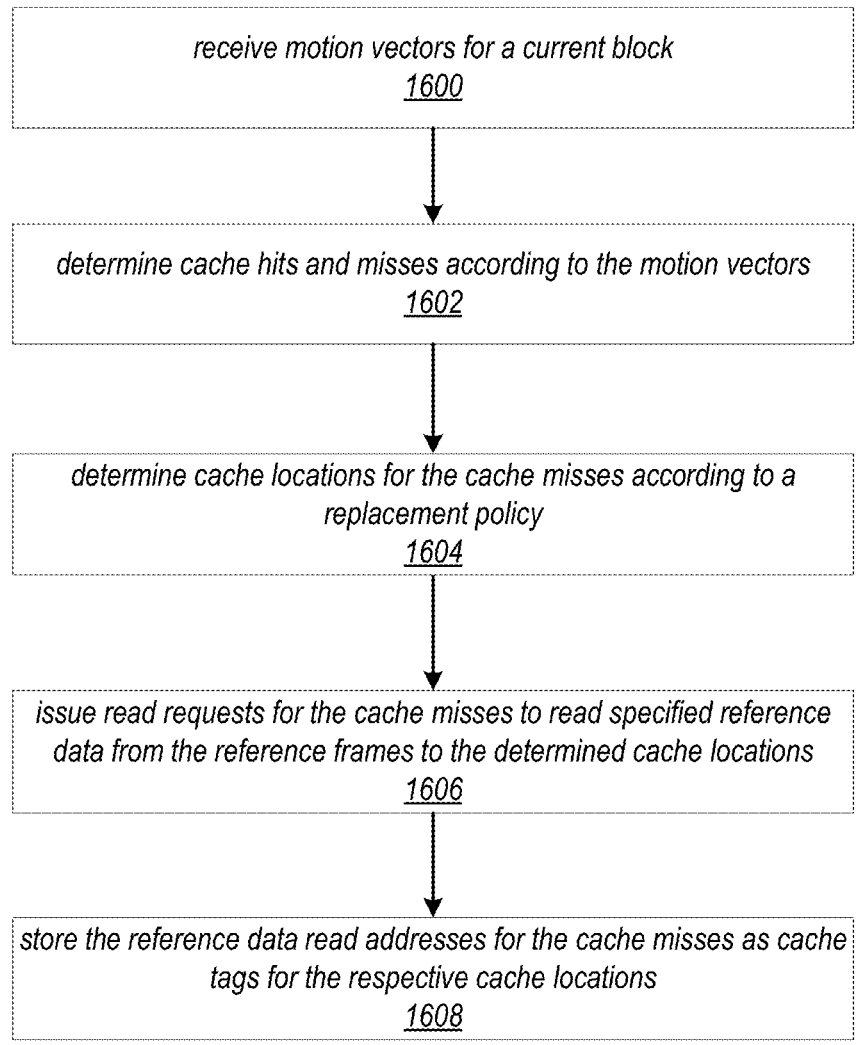
FIG. 16 is a high-level flowchart of a method for caching chroma data to a chroma cache, according to at least some embodiments.

FIG. 16 is a high-level flowchart of a method for prefetching and caching chroma reference data in a chroma cache, according to at least some embodiments. The method of FIG. 16 may be implemented by chroma cache logic that may extend over two or more stages of a block processing pipeline. As indicated at 1600, one or more motion vectors may be received for a current macroblock. As indicated at 1602, chroma cache hits and misses may be determined according to the motion vectors. In at least some embodiments, for each macroblock motion vector, one or more reference motion vectors are generated that each indicate a memory block in the reference data that contains at least a portion of a chroma pixel region needed for the macroblock motion vector. The reference motion vectors may be used to check a set of cache tags to determine hits and misses. As indicated at 1604, locations of cache blocks in the chroma cache for the cache misses may be determined according to a chroma cache replacement policy. As indicated at 1606, read requests may be issued for the cache misses to prefetch specified memory blocks of reference data into the cache blocks at the determined cache locations. The reference motion vectors may be used as read addresses for the memory blocks of reference data. As indicated at 1608, the reference motion vectors for the cache misses may be stored as cache tags for the respective cache blocks. In at least some embodiments, status of the respective cache blocks may be marked as pending. When a memory block is read into a cache block, the cache block's status may be changed to ready. At a downstream stage of the pipeline that accesses reference data from the cache, the status of cache blocks for a given macroblock at the stage can be checked to determine if the respective memory blocks have been fetched. The elements of FIG. 16 are described in more detail in the following discussion.

FIG. 8 illustrates, at a high level, an example block processing pipeline 800 using a chroma cache 830 for chroma reference data 882, according to at least some embodiments. In a video encoding block processing pipeline 800, chroma reference data 882 from one or more frames that have been previously processed in the pipeline 800 may be stored to a memory 880 external to the pipeline 880, for example as illustrated in FIG. 3. In at least some embodiments, the pipeline 800 may include a chroma cache 830 memory, managed by chroma cache logic implemented by a chroma cache unit, module or engine, to which portions of the chroma reference data 882 may be read from the memory 880 for local access at one or more stages 810 of the pipeline 800. The chroma cache 830 may, for example, be implemented in a local (to the pipeline) memory, such as SRAM (static random access memory). As shown in FIG. 8, the request for chroma reference data for a given macroblock passing through the pipeline 800 may be initiated one or more stages (e.g., at stage 810A) prior to the stage (stage 810B) that needs the chroma reference data to provide time (one or more pipeline cycles) to read the needed chroma reference data from the memory 880 into the chroma cache 830 before the stage 810B processes the given macroblock according to chroma reference data accessed from chroma cache 830. For example, stage 810A may be a first stage of a luma compensation and reconstruction component of the pipeline 800, and stage 810B may be a first stage of a chroma compensation and reconstruction component of the pipeline 800.

In at least some embodiments, chroma cache logic may implement a replacement policy in which chroma reference data is cached in the chroma cache 830 for several pipeline cycles so that the chroma reference data in the cache 830 may be reused for macroblocks that are upcoming or nearby in the pipeline 800. The chroma reference data may overlap for at least some macroblocks that are nearby in the pipeline processing. For example, in at least some embodiments, macroblocks may be input to the block processing pipeline 800 according to a method such as the knight's order processing method using row groups that may provide temporal locality of reference data for macroblocks passing through the pipeline 800.

In at least some embodiments, the chroma cache 830 may be checked for hits and misses for each macroblock, and only the data that needs to be fetched (i.e., the misses) may be fetched from memory 882 into chroma cache 830 locations determined according to the replacement policy. In at least some embodiments, the chroma reference data is fetched into cache locations that have aged out according to the replacement policy. Cache locations that contain chroma reference data for macroblocks that are in the pipeline 800 but that have not yet been processed through stage 810B (e.g., chroma motion compensation) are determined as "don't touch" locations and are protected by the replacement policy. In the replacement policy, indications of cache locations that contain chroma reference data for macroblocks that have been processed through stage 810B (e.g., chroma motion compensation) are put into a first of two or more aging buckets (a "most recent" bucket), and are pushed down the aging buckets over several pipeline cycles. Cache locations required for cache misses may be determined from the last (oldest) aging bucket if possible, and if not from the next oldest bucket, and so on.

In at least some embodiments, the chroma reference data 882 may be stored in an external memory 880 according to macroblock tile format(s) as illustrated in FIGS. 4 through 7, each tile including two or more memory blocks (e.g., 16×4 64-byte memory blocks) depending upon the chroma format as illustrated in FIGS. 5 through 7. The chroma cache 830 may include N (e.g. 512) cache blocks (e.g., 64-byte cache blocks) for caching the memory blocks of chroma pixel data fetched from the tiles in external memory 880. The chroma cache 830 may be a fully associative cache; in other words, memory blocks of chroma pixels may be cached to any available cache block location in the cache 830. The chroma cache logic may maintain a set of N cache tags with a one-to-one correspondence to the N cache blocks in the cache 830. For an example reference motion vector that may be stored as a chroma cache tag, see FIG. 10. For an example chroma cache with cache tags, see FIG. 14.

Figure 11:
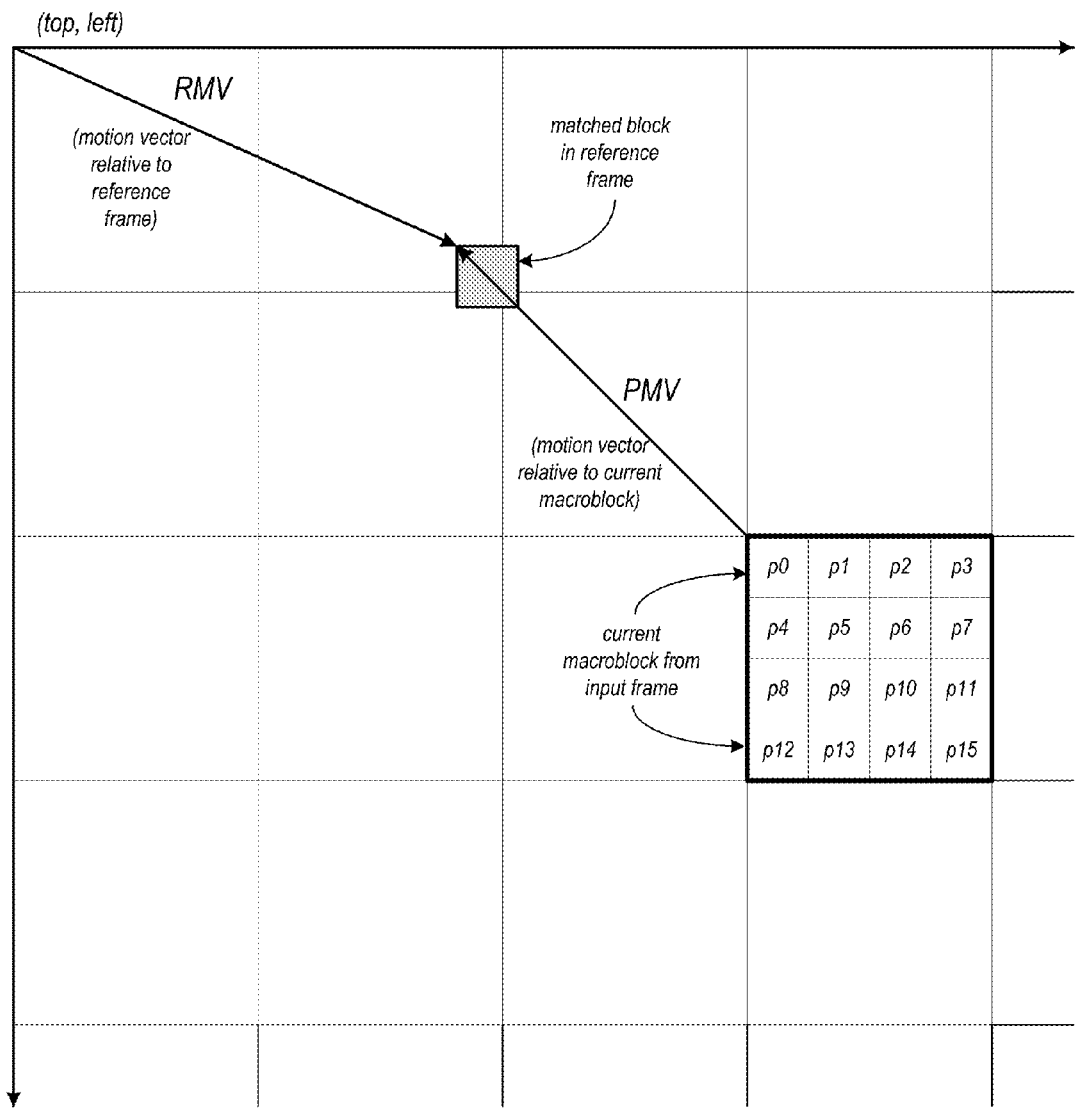
FIG. 11 illustrates motion vectors relative to macroblocks and relative to reference frames, according to at least some embodiments.

Chroma data requests, (e.g., DMA read requests) issued at stage 810A may specify particular memory blocks in the chroma reference data 882 to be read into particular cache blocks of chroma cache 830. In at least some embodiments, the memory blocks in the chroma reference data 882 for which requests are issued at stage 810A for a given macroblock may be determined based on a set of motion vectors for the macroblock that were determined by and received from upstream stage(s) of the pipeline 800, for example from intra-frame and inter-frame estimation 6010 and mode decision 6020 stages as illustrated in FIG. 22. In at least some embodiments, for each macroblock motion vector obtained from an upstream stage, the chroma cache logic may generate a set of one two, or more motion vectors relative to a reference frame, for example as illustrated in FIG. 11. Each of these motion vectors indicates the position of a memory block of chroma reference data in memory 880 as illustrated in FIGS. 3 through 7. In at least some embodiments, each of these motion vectors is or represents a DMA read address in memory 880 for the respective memory block of chroma reference data.

In at least some embodiments, the motion vectors (e.g., DMA read addresses) used to prefetch the memory block of chroma reference data from memory 880 into cache blocks of the chroma cache 830 may be used as the cache tags for the cache blocks. For each generated motion vector, the chroma cache logic checks the cache tags to determine hits and misses in the chroma cache 830. For each cache miss, a chroma cache location may be determined according to a replacement policy, and a DMA read request (using the respective motion vector) may be issued to the memory 882 to read the respective memory block of chroma reference data from the memory 882 into the determined chroma cache 830 location. The motion vector used to prefetch the memory block of chroma reference data into a determined chroma cache block is stored as the cache tag for the determined chroma cache block. Thus, to check for chroma cache hits and misses for a macroblock, the chroma cache logic only needs to compare the motion vectors for the macroblock to the existing cache tags, and does not have to do expensive memory address translations.

Figure 9:
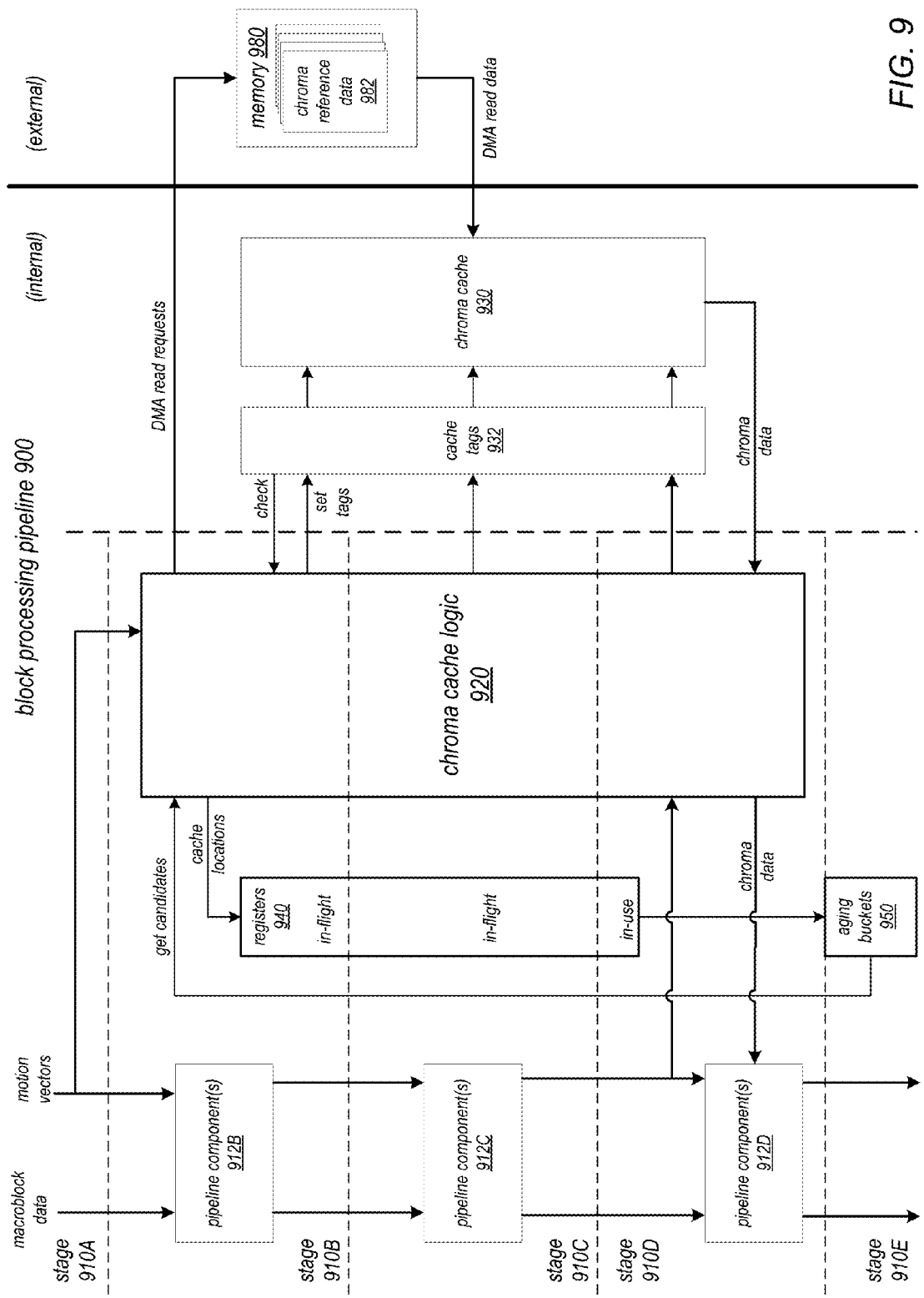
FIG. 9 illustrates a chroma cache and chroma cache logic in a block processing pipeline, according to at least some embodiments.
Figure 21A:
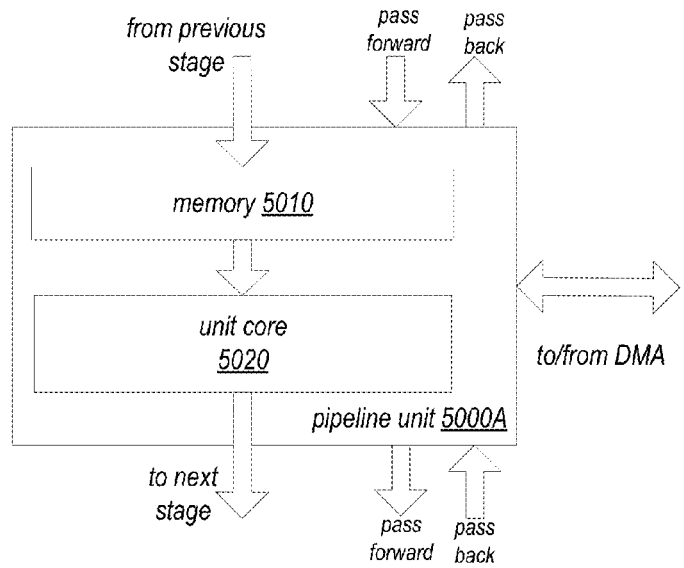
FIGS. 21A and 21B are block diagrams of example pipeline processing units that may be used at the stages of a block processing pipeline that implements one or more of the block processing methods and apparatus as described herein, according to at least some embodiments.
Figure 21B:
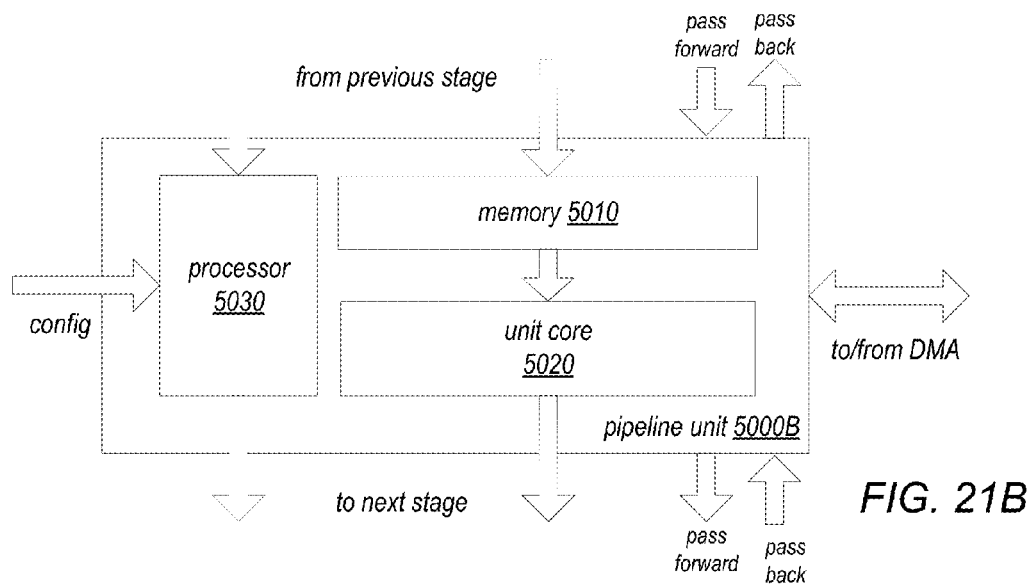
Figure 21C:
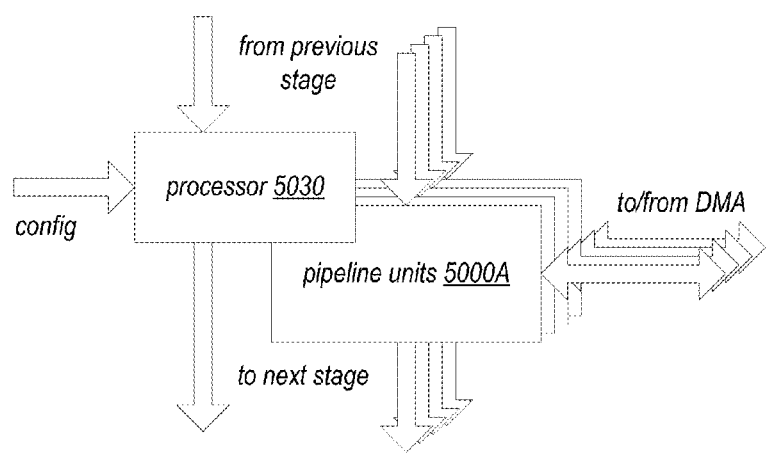
FIG. 21C shows that a single processor may be associated with a group of two or more pipeline units.

FIG. 9 illustrates a chroma cache 930 and chroma cache logic 920 in an example video encoding block processing pipeline 900 in more detail, according to at least some embodiments. As a non-limiting example of a block processing pipeline 900, referring to FIG. 22, in some embodiments stage 910A may be a mode decision 6020 stage, stages 910B and 910C may be luma motion compensation and reconstruction stages, and stages 910D and 910E may be chroma motion compensation and reconstruction stages. Each stage 910 may include one or more hardware and/or software components 912 that implement functionality of the respective stage 910. FIGS. 21A through 21C illustrate example pipeline processing units that may be used at the stages 910 of a block processing pipeline 900. While not shown in FIG. 9, each stage 910 may include one or more double-buffered memory units that allows the pipeline component(s) 912 of a stage 910 to read and process data for a current macroblock from the memory while data for a next macroblock is being written to the memory unit from a previous stage 910.

Chroma reference data 982 from one or more frames that have been previously processed in the pipeline 900 may be stored to a memory 980 external to the pipeline 900, for example as illustrated in FIG. 3. In at least some embodiments, a chroma cache 930 memory may be implemented to which portions of the chroma reference data 982 corresponding to motion vectors for macroblocks being processed in the pipeline 900 may be prefetched from the memory 980 at an upstream stage 910B of the pipeline for access at a downstream stage 910D of the pipeline 900. In at least some embodiments, the chroma cache 930 may be managed by chroma cache logic 920 of the block processing pipeline 900. The chroma cache logic 920 may extend over multiple stages 910 of the pipeline, for example three stages 910B through 910D as shown in FIG. 9, and may be implemented in hardware, software, or a combination thereof. The chroma cache logic 920 may be implemented by one or more chroma cache units, modules, or engines. FIGS. 21A and 21B illustrate example processing units that may implement chroma cache logic 920 in a pipeline 920. As shown in FIG. 9, fetches (e.g., DMA read requests) for the motion vectors of a given macroblock passing through the pipeline may be initiated via the chroma cache logic 920 at stage 910B two stages prior to access at stage 910D of the pipeline 900 to provide multiple pipeline cycles to prefetch the respective memory blocks from the memory 980 into the chroma cache 930 before the stage 910D processes the respective macroblock.

In at least some embodiments, the chroma reference data 982 may be stored in an external memory 980 according to macroblock tile format(s) as illustrated in FIGS. 4 through 7, each tile including two or more memory blocks depending upon the chroma format as illustrated in FIGS. 5 through 7. In at least some embodiments, the chroma cache 930 may include N cache blocks (e.g., 64-byte cache blocks) into which memory blocks of chroma reference data may be prefetched from the memory 980. In at least some embodiments, the chroma cache 930 may be a fully associative cache; in other words, the memory blocks of chroma pixels read from memory 980 may be cached to any available cache block in the cache 930. In at least some embodiments, cache tags 932 may be used to reference the cache blocks in the chroma cache 930, with a one-to-one correspondence between the cache tags 932 and the cache blocks in the chroma cache 930.

In at least some embodiments, the cache tags 932 may be defined by respective motion vectors. When a motion vector for a current macroblock is processed at a first stage of the chroma cache logic (stage 910B in FIG. 9), the cache tags 932 can be checked according to the motion vector, without address translation, to determine if there are cache blocks corresponding to the motion vector in the cache 930. One or more reference motion vectors are derived from the motion vector, and the cache tags 932 are checked for cache hits and misses according to the reference motion vectors. Upon a cache miss, a cache block in the cache 930 is selected according to a replacement policy, and a prefetch request (e.g., a DMA read request) using the respective reference motion vector is issued to the memory 980 for a memory block of reference data to be read into the selected cache block. The reference motion vector is stored as the cache tag 932 for the selected cache block. For an example reference motion vector that may be stored as a chroma cache tag, see FIG. 10. For an example chroma cache with cache tags, see FIG. 14.

In at least some embodiments, chroma cache logic 920 may also maintain a status for the cache blocks in the cache 930. When a prefetch request is issued for a selected cache block (e.g., at stage 910B in FIG. 9), the status of the selected cache block may be marked as pending. When the memory block is read into the cache block, the cache block's status may be changed to ready. At a downstream stage of the pipeline that accesses reference data from the cache (e.g., at stage 910D in FIG. 9), the status of the cache blocks for a given macroblock at the stage can be checked to determine if the respective memory blocks have been fetched.

Figure 12:
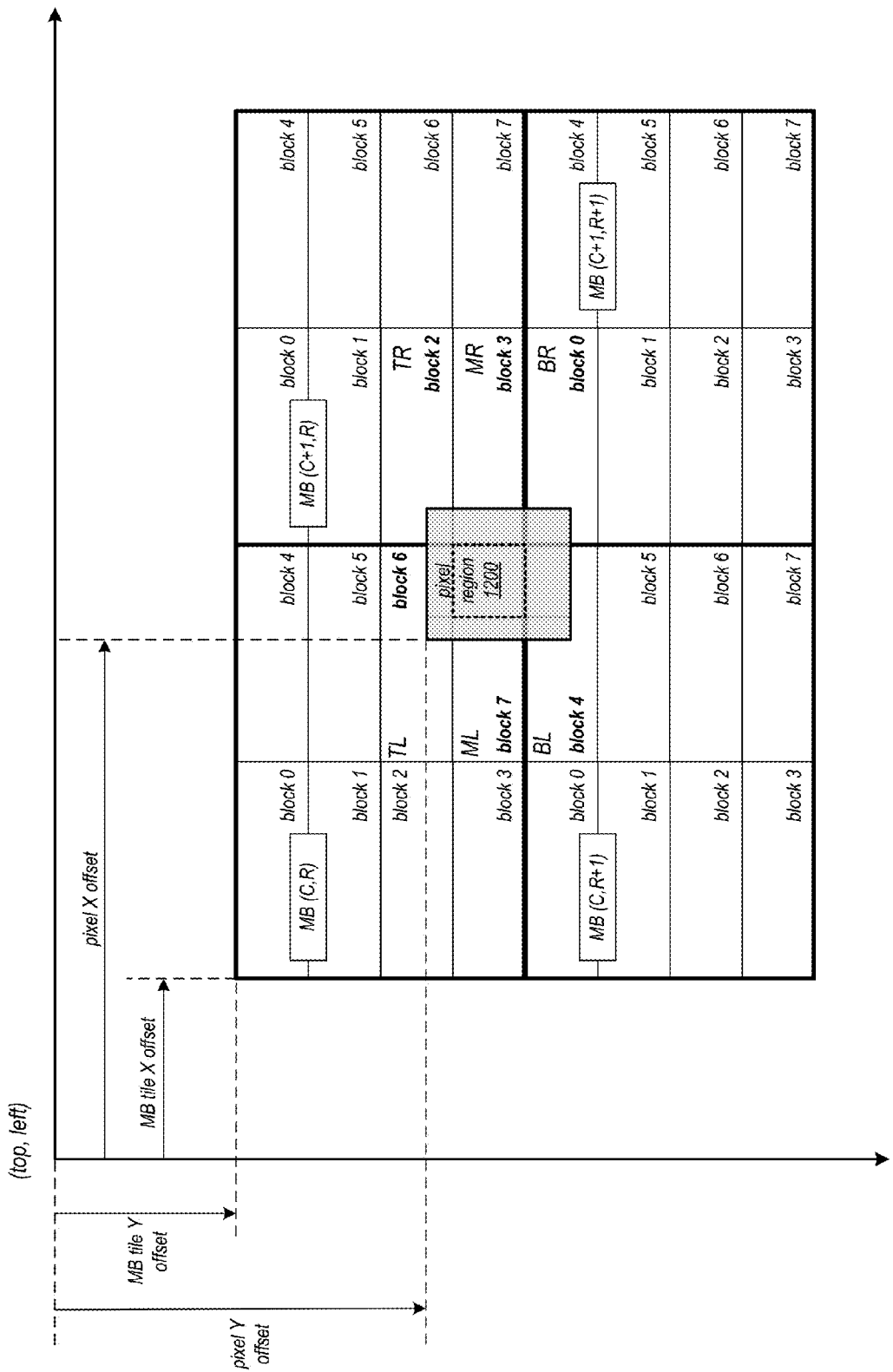
FIG. 12 illustrates memory blocks in macroblock tiles for a motion vector, according to at least some embodiments.

In at least some embodiments, at stage 910B, the chroma cache logic 920 may obtain a set of best motion vectors for a given macroblock from an upstream stage 910A of the pipeline 900, for example from a mode decision 6020 stage as described in reference to FIG. 22. Each motion vector indicates a position in a reference frame of a matched region of pixels for a respective partition of a macroblock currently at, or being received at, stage 910B of the pipeline. The motion vectors may indicate the positions of the matched regions relative to the macroblock, for example as illustrated in FIG. 11, and may be referred to as macroblock motion vectors. Note that a matched region may be contained within one memory block as illustrated in FIGS. 5 through 7, may extend into two or more of the memory blocks within a tile as illustrated in FIGS. 5 through 7, or may extend into memory blocks across two or four of the tiles as illustrated in FIG. 4. FIG. 12 shows an example of a pixel region that extends across multiple (six) memory blocks in multiple (four) chroma 4:4:4 tiles. Thus, one, two, or more of the memory blocks in a reference frame may need to be prefetched from memory 980 into the chroma cache 930 for a given motion vector.

In at least some embodiments, for each motion vector obtained from an upstream stage 910A, the chroma cache logic 920 may generate a set of one two, or more motion vectors relative to a location (e.g., the top, left corner) of a reference frame, for example as illustrated in FIG. 11. For clarity and convenience, the motion vectors received from the previous stage may be referred to herein as pipeline motion vectors (PMVs), and the motion vector(s) generated for the PMVs may be referred to herein as reference motion vectors (RMVs). Each RMV indicates the position of a memory block of chroma reference data in memory as illustrated in FIGS. 3 through 7. In at least some embodiments, each RMV is or represents a DMA read address in memory 980 for the respective memory block of chroma reference data.

In at least some embodiments, the RMVs for memory blocks of chroma reference data prefetched into cache blocks in the chroma cache 930 may be used as the cache tags for the respective cache blocks. For each generated RMV, the chroma cache logic 920 checks the cache tags to determine hits and misses in the chroma cache 930. For each cache miss, a chroma cache block may be determined according to a replacement policy, and a DMA read request (using the RMV) may be issued to the memory 982 to read the respective memory block of chroma reference data from the memory 980 into the determined chroma cache block. The RMV is stored as the cache tag 932 for the determined chroma cache block. Thus, to check for cache hits and misses, the chroma cache logic 930 only needs to compare RMVs, and does not have to do expensive memory address translations.

The PMVs for a macroblock received at stage 910B may be passed down the pipeline 900 through stage 910C to stage 910D with the macroblock data. In some embodiments, at stage 910D, the PMVs may be passed to and used by the chroma cache logic 920 at the stage to access the prefetched chroma reference data needed by pipeline component(s) 912D at the stage for processing the respective macroblock from the chroma cache 930. In at least some embodiments, chroma cache logic 920 may check status of the cache blocks for the respective macroblock at stage 910D to determine if the respective memory blocks have been successfully fetched. Typically, the cache blocks for the macroblock will be ready, as prefetching the reference data at an upstream stage (e.g., stage 910B) allows multiple pipeline cycles to read the reference data from the external memory 980. However, if any of the cache blocks are pending or not ready, the pipeline 900 may be stalled to wait for the respective memory blocks to be fetched from memory 980 into the cache 930.

Chroma Cache Replacement Policy

In at least some embodiments of a chroma cache replacement policy, the chroma cache logic 920 may track the chroma cache blocks corresponding to the macroblocks that are at respective stages 910 in the pipeline 900, for example using a set of N-bit registers 940. When cache blocks are determined for a macroblock at a first stage 910B of the chroma cache logic 920, corresponding bits in a first register 940 may be set. FIG. 15A shows an example register with example bits set for an example macroblock. The contents of the registers 940 are passed down through the stages 910 of the pipeline 900 with the macroblock. The stages 910B and 910C and corresponding registers 940 before stage 910D (e.g., a chroma motion compensation stage) may be referred to as in-flight stages 910 and registers 940; the chroma motion compensation stage and corresponding register(s) 940 may be referred to as the in-use stage and register(s) 940. In at least some embodiments, a logical operation (e.g., a bitwise OR) of the in-flight and in-use registers 940 indicates all of the current "don't touch" cache blocks in the chroma cache to the chroma cache logic 920, for example as illustrated in FIG. 15B. When chroma cache logic 920 at stage 910B selects cache blocks in chroma cache 930 for reuse with motion vectors of a next macroblock in the pipeline 900 to be processed, the current "don't touch" cache blocks as indicated by the in-flight and in-use registers 940 are not selected.

In at least some embodiments of a chroma cache replacement policy, an additional set of M registers may be used as aging buckets 950 from which replacement candidates are selected, for example as illustrated in FIG. 15C. For example, in some embodiments, four buckets (buckets 0-3) may be used. The aging buckets 950 may be used by the chroma cache logic 920 to store indications of cache blocks that are not currently in the "don't touch" category. In at least some embodiments, when done with a macroblock at stage 910D (e.g., a chroma motion compensation stage), the contents of the in-use register that are not also in the in-flight registers may be pushed into the first aging bucket 950. Logical operations may be used to push indications of available cache blocks through the aging buckets 950 at pipeline cycles (every four cycles, in some embodiments), with a first bucket (bucket 0) being filled according to the in-flight and in-use register 940 contents, bucket 1 filled according to the content of bucket 0, and so on. When chroma cache logic 920 at stage 910B selects replacement candidate cache blocks from chroma cache 930 to which chroma cache misses are to be fetched, the last aging bucket (bucket 3) is checked first, then the next bucket (bucket 2), and so on. In at least some embodiments, each time a replacement candidate is picked from an aging bucket 950, its corresponding bit in the bucket 950 is cleared. In at least some embodiments, more aging buckets may be added as and if needed.

In at least some embodiments, the chroma cache architecture as illustrated in FIG. 9 allows checking of status of the chroma cache 930 at one or more stages 910 of the pipeline 900 according to assertions enabled by the architecture. Logical operations may be used to check these assertions, and the chroma cache logic 920 may be configured to take appropriate action based on results. For example, each cache block in the chroma cache 930 can only be indicated in one aging bucket 950. A cache block indicated as a don't touch cache block (e.g., according to a bitwise OR of the in-flight and in-use registers 940) should not be in any aging bucket 950. In at least some embodiments, a logical sum of all the aging buckets 950 plus the don't touch cache blocks indicated by the in-flight and in-use registers 940 should indicate the entire set of all cache blocks in the chroma cache 930.

Converting Motion Vectors to DMA Read Addresses

FIGS. 10 through 13B graphically illustrate embodiments of methods for converting motion vectors relative to a macroblock received at a first stage 910B of chroma cache logic 920 (referred to as pipeline motion vectors (PMVs)) to a set of motion vectors relative to a reference frame (referred to as reference motion vectors (RMVs)) that may be used as DMA read addresses to prefetch memory blocks of reference data from an external memory 980, according to at least some embodiments. The RMVs may be used to prefetch memory blocks of chroma reference pixels from memory 980, and may be stored as cache tags 932 for the chroma cache 930. Thus, unlike conventional caches for which cache tags typically contain either virtual or physical memory addresses and which typically require expensive memory address translation to access, cache tags 932 for the chroma cache 930 contain RMVs that can be constructed quickly from the input PMVs.

In at least some embodiments, the chroma reference data 982 may be stored in an external memory 980 according to macroblock tile format(s) as illustrated in FIGS. 3 through 7, each tile including two or more memory blocks depending upon the chroma format as illustrated in FIGS. 5 through 7. The DMA read requests issued by the chroma cache logic 920 may each specify a particular memory block in a particular tile in a particular reference frame stored in the memory 980. Using the macroblock tile format(s) as illustrated in FIGS. 3 through 7, each memory block fetched to the chroma cache 930 contains Cr/Cb components from pixels that are most adjacent to each other. In cache terminology, this enables the chroma cache 930 to provide spatial locality of the chroma pixels it caches. Note that embodiments of the replacement policy as described herein may also provide temporal locality for chroma reference data. In addition, the macroblock tile format(s) as illustrated in FIGS. 3 through 7 allows the chroma cache logic 920 to switch between 4:4:4, 4:2:2, and 4:2:0 video formats by simply adjusting the number of bits used in the DMA read requests/cache tags to address the memory blocks within the tiles.

Figure 10:
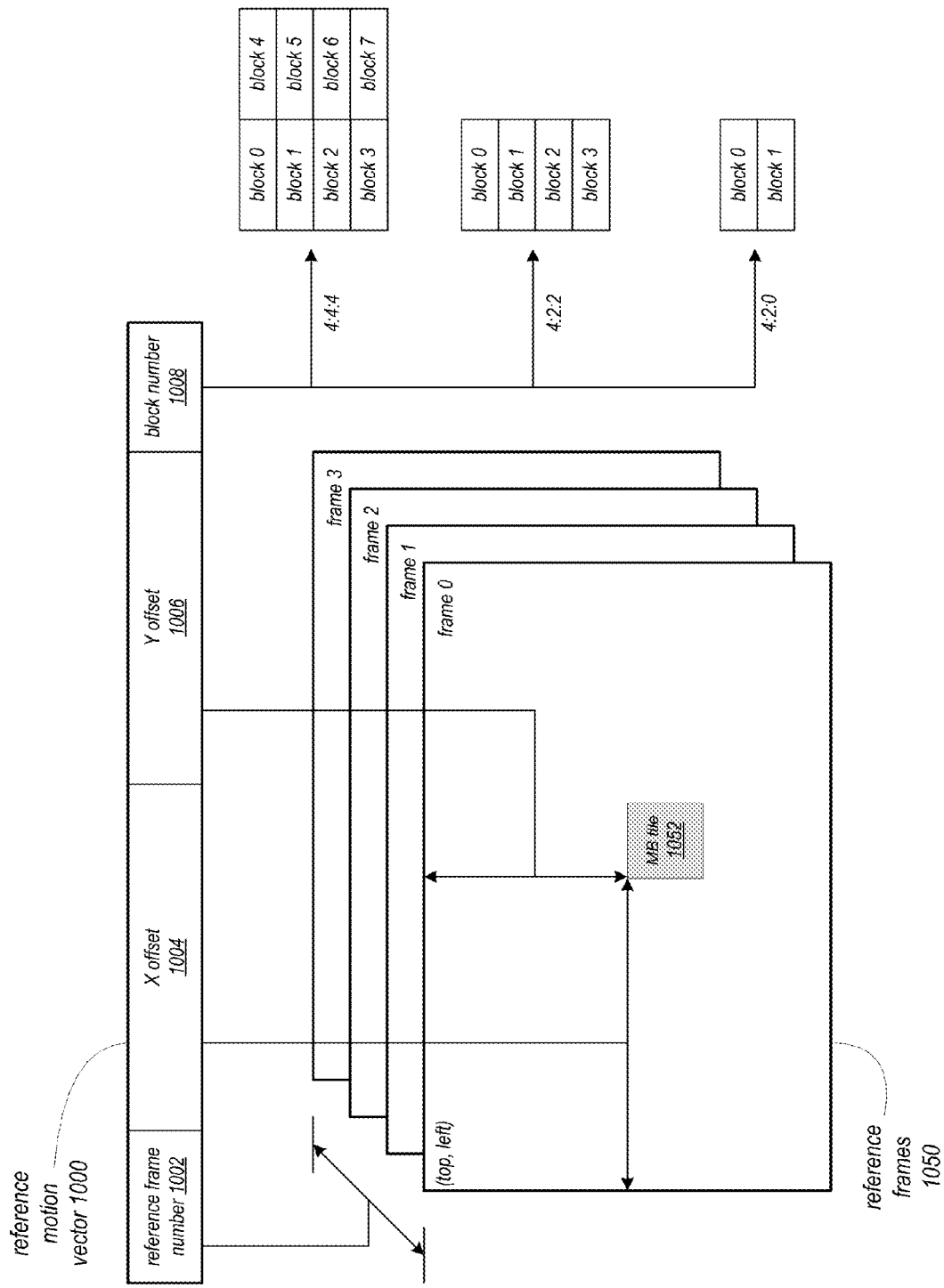
FIG. 10 illustrates a reference motion vector that may be stored as a chroma cache tag, according to at least some embodiments.

FIG. 10 illustrates a reference motion vector that may be stored as a chroma cache tag, according to at least some embodiments. Reference motion vector 1000 illustrates an example address format that may be used by the chroma cache logic 920 to request a memory block of chroma pixels from reference frames 1050 stored in an external memory 980, for example via a Read DMA channel. The reference motion vector 1000 may also be stored as the cache tag 932 for a respective location (cache block) in the cache 930 into which the memory block of chroma pixels is read. In at least some embodiments, the reference motion vector 1000 may include at least a reference frame number 1002, X offset 1004, Y offset 1006, and memory block number 1008.

In at least some embodiments, macroblocks may be encoded using reference data from one, two, or four reference frames. Thus, in at least some embodiments, the reference motion vector 1000 may include a reference frame number 1002 field that is used to indicate which of the reference frames this reference motion vector 1000 addresses.

X offset 1004 may indicate the horizontal offset of a macroblock tile (MB tile 1052) from the origin (top, left) or base address of the indicated reference frame in the memory 980. Y offset 1006 may indicate the vertical offset of a macroblock tile (MB tile 1052) from the origin (top, left) or base address of the indicated reference frame in the memory 980. In some embodiments, the X and Y offsets may be expressed as the number of macroblock tile columns and rows as shown in FIG. 4.

Block number 1008 may be used to specify a memory block within MB tile 1052. In at least some embodiments, the chroma reference data may be stored in memory 980 according to macroblock chroma tile format(s) as illustrated in FIGS. 4 through 7, each tile including two or more memory blocks depending upon the chroma format, as illustrated in FIGS. 5 through 7. Thus, as shown in FIG. 10, block number 100 may be used to specify one of the eight memory blocks (0-7) within a tile in 4:4:4 mode, one of the four memory blocks (0-3) within a tile in 4:2:2 mode, or one of the two memory blocks (0-1) within a tile in 4:2:2 mode.

In at least some embodiments, block number 1008 may be a 3-bit field. In 4:4:4 mode, the three bits [2:0] are used to select one of the eight memory blocks (0-7) that form the 4:4:4 chroma macroblock tile. In 4:2:2 mode, only bits [1:0] are used to select one of the four memory blocks (0-3) that form the 4:2:2 chroma macroblock tile. In 4:2:0 mode, only bit [0] is used to select one of the two memory blocks (0-1) that form the 4:2:0 tile.

FIG. 11 illustrates motion vectors relative to macroblocks and relative to reference frames, according to at least some embodiments. With reference to FIG. 9, motion vectors received from an upstream stage 910A at a first stage 910B of chroma cache logic 920 may indicate the positions of matched regions in reference frames relative to the macroblock in the current frame. The motion vectors received from the previous stage may be referred to as pipeline motion vectors (PMVs). For each PMV, chroma cache logic 920 may generate a set of one two, or more motion vectors relative to a location (e.g., the top, left corner) of a reference frame. The motion vector(s) generated for the PMVs may be referred to herein as reference motion vectors (RMVs). Each RMV indicates the position of a memory block of chroma reference data in memory as illustrated in FIGS. 3 through 7 and in FIG. 10. In at least some embodiments, each RMV is or represents a DMA read address in memory 980 for a respective memory block of chroma reference data.

FIG. 12 illustrates memory blocks in macroblock tiles for a motion vector, according to at least some embodiments. FIG. 12 uses 4:4:4 chroma format tiles as illustrated in FIG. 5 as an example. With reference to FIGS. 9 and 11, in at least some embodiments, at stage 910B, the chroma cache logic 920 may obtain a set of pipeline vectors (PMVs) for a given macroblock from an upstream stage 910A of the pipeline 900, for example from a mode decision 6020 stage as described in reference to FIG. 22. A PMV received from an upstream stage 910A at a first stage 910B of chroma cache logic 920 may indicate a position in a reference frame of a matched region of pixels 1200 for a respective partition of a macroblock currently at, or being received at, stage 910B of the pipeline.

Note that, in some embodiments, the region 1200 that is fetched from memory 980 for a given PMV may be larger than the respective partition size, for example to allow for subpixel interpolation. For example, for PMVs corresponding to 4×4 macroblocks partitions in 4:4:4 chroma format, a 9×9 pixel region 1200 may be fetched (shown by the shaded square in FIG. 12), with the 4×4 matched region (shown by the dotted square in FIG. 12) expanded to include two extra rows and columns of pixels on the top and left and three extra rows and columns of pixels on the bottom and right. Note that the region 1200 size may vary based on the chroma format or other factors.

Figure 13A:
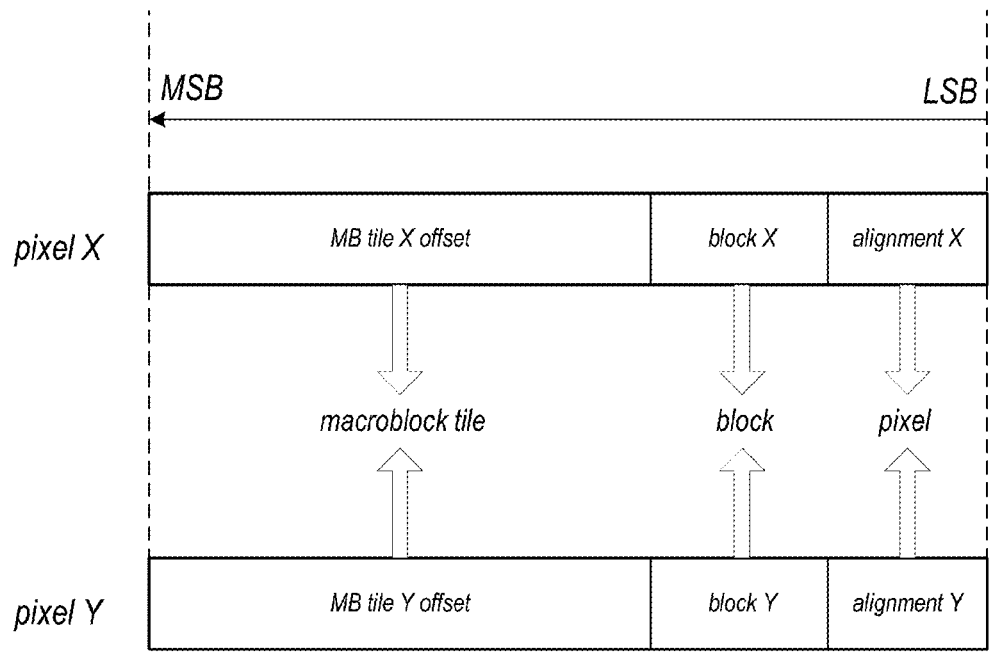
FIG. 13A illustrates deriving a reference motion vector (RMV) from an input pipeline motion vector (PMV), according to at least some embodiments.
Figure 13B:
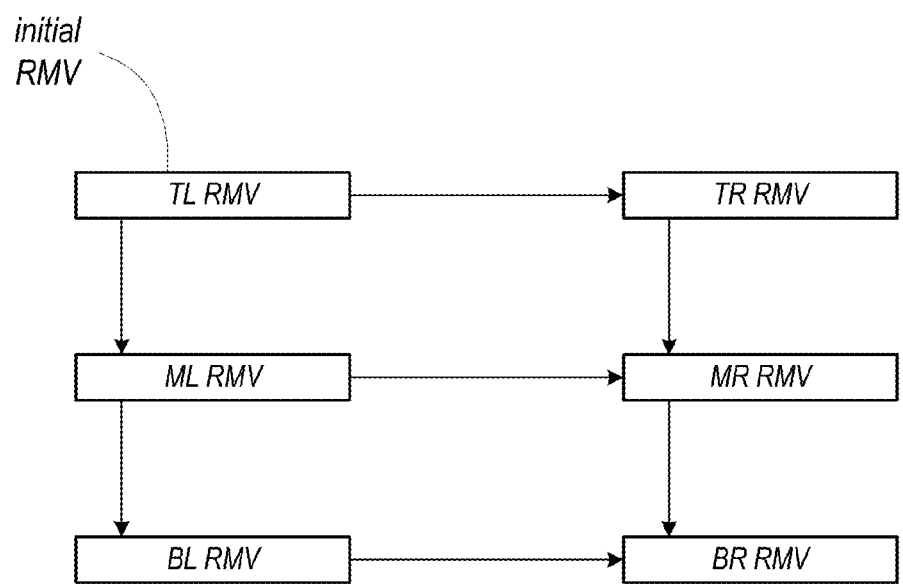
FIG. 13B illustrates generating a set of reference motion vectors (RMVs) for an input pipeline motion vector (PMV), according to at least some embodiments.

The PMV may indicate the position of the matched region 1200 relative to the macroblock in the input frame currently being processed in the pipeline 900, for example as illustrated in FIG. 11. In at least some embodiments, the top, left corner of the pixel region 1200 as indicated by the PMV may be used by the chroma cache logic 920 determine a macroblock tile and memory block within that tile that contains at least the top, left pixel of region 1200 (indicated by pixel X offset and pixel Y offset), and may generate an RMV for that tile and memory block, for example as illustrated in FIG. 13A. Note, however, that the pixel region 1200 may be contained within one memory block in a macroblock tile as illustrated in FIGS. 5 through 7, may extend into two or more of the memory blocks within a tile as illustrated in FIGS. 5 through 7, or may extend into memory blocks across two or four of the macroblock tiles as illustrated in FIG. 4. Thus, one, two, or more of the memory blocks in a reference frame may need to be prefetched from memory 980 into the chroma cache 930 for a given PMV. Thus, in at least some embodiments, chroma cache logic 920 may determine an RMV from the PMV for the initial (top, left) tile, for example as illustrated in FIG. 13A, and then derive RMVs for one or more (up to five) other tiles from the initial RMV as necessary, for example as illustrated in FIG. 13B.

FIG. 12 shows an example of a pixel region 1200 that extends across multiple (six) memory blocks in multiple (four) chroma 4:4:4 macroblock tiles. The four macroblock tiles are labeled as MB (C#, R#), where C# and R# stand for macroblock tile column and row numbers as illustrated in FIG. 4. The six memory blocks that contain the region 1200 are labeled as top left (TL), middle left (ML), bottom left (BL), top right (TR), middle right (MR) and bottom right (BR). In this example, TL is MB (C, R), block 6; ML is MB (C, R), block 7; bottom left is MB (C, R+1), block 4; TR is MB (C+1, R), block 2; MR is MB (C+1, R), block 3; and bottom right is MB (C+1, R+1), block 0. In at least some embodiments, chroma cache logic 920 determines an RMV for each of these memory blocks in the respective reference frame, checks the cache tags 932 for hits and misses, and, for each miss, issues the RMV as a DMA read request to the memory 980 to prefetch the respective memory block of chroma pixels into a cache block location in the chroma cache 930 determined according to a chroma cache replacement policy. In at least some embodiments, to determine the RMVs for the memory blocks to be prefetched, chroma cache logic 920 may determine an RMV from the PMV for an initial memory block (TL, MB (C, R), block 6 in this example), for example as illustrated in FIG. 13A, and then derive RMVs for the other memory blocks from the initial RMV, for example as illustrated in FIG. 13B.

While FIG. 12 uses 4:4:4 chroma format as an example, similar methods would apply to other chroma formats, e.g. 4:2:2 and 4:2:0 formats as illustrated in FIGS. 6 and 7.

FIG. 13A illustrates deriving a reference motion vector (RMV) from an input pipeline motion vector (PMV), according to at least some embodiments. As shown in FIG. 13A, portions of the X and Y components of the input PMV may be used to derive the X and Y components of the macroblock tile offset in the reference frame, the memory block number within the tile, and the pixel within the memory block. In some embodiments, one or more of the least significant bits (LSBs) of the pixel X and Y components may indicate the (top, left) pixel position within a memory block, one or more next bits may indicate the memory block, and the most significant bits (MSBs) may indicate the macroblock tile within the reference frame. The macroblock tile and memory block number as derived from the PMV may be used in a reference motion vector, for example a reference motion vector 1000 as shown in FIG. 10.

In some embodiments, referring to FIG. 12, the pixel position derived from the PMV may indicate one of 32 possible pixel locations for the top, left corner of the pixel region 1200 within the memory block derived from the PMV. This information may, for example, be used in determining what pixels from what memory blocks are in the pixel region 1200, and may also be used in determining optimizations when fetching the full pixel region 1200 is not necessary. For example, referring to FIG. 12, given a 9×9 region 1200 indicated by the shaded square for a 4×4 partition size indicated by the dotted square, if the fractional bits of both the X and Y motion vector components are not zero, then the entire 9×9 region is needed, and the TL, ML, BL, TR, MR, and BR memory blocks all need to be fetched. However, if the fractional bits of both the X and Y motion vector components are zeros, then only the 4×4 partition indicated by the dotted square is needed. Consequently, only the ML memory block needs to be fetched. If only the X component's fractional bits are zeros, then a 4×9 region is needed, and only the TL, ML, and BL memory blocks need to be fetched. If only the Y component's fractional bits are zeros, then a 9×4 region is needed, and only the ML and MR memory blocks need to be fetched.

FIG. 13B illustrates generating a set of reference motion vectors (RMVs) for an input pipeline motion vector (PMV), according to at least some embodiments. In at least some embodiments, an initial RMV (the top left (TL) RMV) may be derived from a PMV, for example as illustrated in FIG. 13A. The TL RMV includes an X and Y offset indicating the position of the macroblock tile in a reference frame, and a block number indicating the particular memory block within the tile, for example as illustrated in FIG. 10. A middle left (ML) RMV and a top right (TR) RMV may be derived from the TL RMV. A bottom left (BL) RMV may be derived from the ML RMV. A middle right (MR) RMV may be derived from the ML and TR RMVs. Finally, a bottom right (BR) RMV may be derived from the BL and MR RMVs.

Chroma Cache Example

Figure 14:
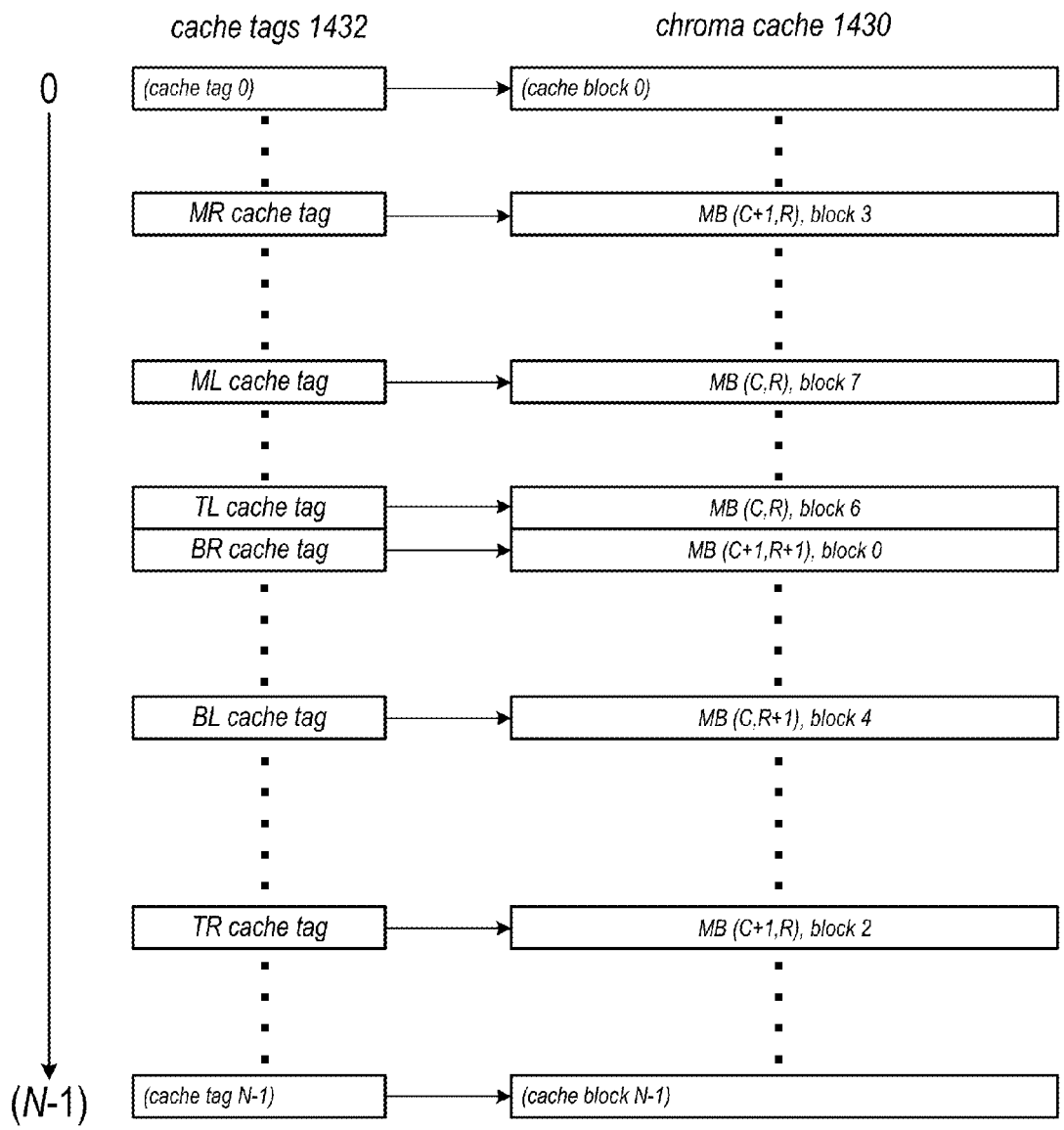
FIG. 14 illustrates a chroma cache and cache tags, according to at least some embodiments.

FIG. 14 graphically illustrates an example chroma cache and cache tags, according to at least some embodiments. The chroma cache 1430 may include N (e.g. 512) cache blocks locations for caching the memory blocks of chroma pixel data fetched from the chroma reference frames in external memory. The chroma cache 1430 may be a fully associative cache; in other words, memory blocks of chroma pixels may be prefetched and cached to any available cache block in the cache 1430. The chroma cache logic may maintain a set of N cache tags 1432 with a one-to-one correspondence to the N cache blocks in the cache 1430.

In at least some embodiments, the RMVs determined for the PMVs of a macroblock by the chroma cache logic may be used as the cache tags 1432. For each generated RMV, the chroma cache logic checks the cache tags 1432 to determine hits and misses in the chroma cache 1430. For each cache miss, a chroma cache 1430 location may be determined according to a replacement policy, and a DMA read request (using the respective RMV) may be issued to the memory to read the respective memory block of chroma reference data from the memory into the determined cache block in chroma cache 1430. The RMV is stored as the cache tag 1432 for the determined cache block. Thus, to check for cache hits and misses, the chroma cache logic 1430 only needs to compare RMVs derived from PMVs to the RMVs stored in the cache tags, and does not have to do expensive memory address translations.

In the example shown in FIG. 14, the TL, ML, BL, TR, BR, and MR RMVs determined for a PMV as illustrated in FIGS. 12 through 13B are shown as cache tags 1432 corresponding to cache blocks in the chroma cache 1430 at which the respective memory blocks from the reference frame as illustrated in FIG. 12 are cached.

Note that, when checking the cache tags 1432 for hits and misses for the RMVs for a given PMV, in some cases one or more of the RMVs may be hits in the cache tags 1432, while one or more others may be misses. For example, the TL, ML, BL, and TR RMVs in this example may be hits, while the BR and MR RMVs may be misses. In that case, cache blocks in chroma cache 1430 are determined for the BR and MR RMVs according to the replacement policy, DMA read requests are issued for the BR and MR RMVs to read the memory blocks (MB (C+1,R+1), block 0 for the BR RMV, MB (C+1,R), block 3 for the MR RMV) into the determined cache blocks of the cache 1430, and the BR and MR RMVs are stored as the respective cache tags 1432 for the determined cache blocks.

Replacement Policy Details

FIGS. 15A through 15C graphically illustrate aspects of a replacement policy, according to at least some embodiments. The discussion of these Figures makes reference to FIG. 17.

FIG. 15A illustrates a register that may be used to track cache blocks in a replacement policy, according to at least some embodiments. In at least some embodiments, the chroma cache logic may use a set of N-bit registers 1540 to track the chroma cache locations used for macroblocks that are at respective stages in the pipeline. As indicated at 1700 of FIG. 17, chroma cache logic may determine chroma cache locations for a current macroblock as previously described. When cache locations are determined for a macroblock by the chroma cache logic, corresponding bits in a first register 1540 may be set. As indicated at 1702 of FIG. 17, the cache locations for the macroblock are passed through in-flight registers to an in-use register. As shown in FIG. 15B, the contents of the first register 1540 are passed down through one or more other registers 1540 at the stages of the pipeline with the macroblock. The registers at stages before a stage that accesses chroma data from the cache (e.g., a chroma motion compensation stage) may be referred to as in-flight registers 1540A; a register at the stage that accesses chroma data from the cache (e.g., a chroma motion compensation stage) may be referred to as an in-use register 1540B.

FIG. 15A shows as an example a portion of the content of an in-flight or in-use register 1540 corresponding to the TL, ML, BL, TR, BR, and MR RMVs determined for a PMV as illustrated in FIGS. 12 through 13B, and as stored in the cache 1430 as illustrated in FIG. 14. As shown in this example, bits in the register 1540 that correspond to the cache tags 1432/cache 1430 locations as shown in FIG. 14 are set to indicate that the respective cache blocks store memory blocks of reference pixels to be used in processing the respective macroblock. Note that other bits corresponding to RMVs determined for other PMVs of the macroblock may also be set in the register 1540. Also note that the set bits in register 1540 indicate both cache locations that were hits and cache locations that were misses.

FIG. 15B further illustrates determining "don't touch" cache blocks from the in-flight registers 1540A and in-use register 1540B, according to at least some embodiments. In at least some embodiments, a logical operation (e.g., a bitwise OR) of the in-flight registers 1540A and in-use register 1540B indicates all of the current "don't touch" cache blocks in the chroma cache to the chroma cache logic. In at least some embodiments, at element 1700 of FIG. 17, when the chroma cache logic selects cache blocks in the chroma cache for reuse with motion vectors of a next macroblock in the pipeline, the current "don't touch" cache blocks as indicated by logical operation applied to the in-flight registers 1540A and in-use register 1540B are not selected.

FIG. 15C illustrates aging buckets, according to at least some embodiments. In at least some embodiments, an additional set of M registers may be used as aging buckets 1550 from which replacement candidates are selected. For example, as shown in this example, four buckets (buckets 0-3) may be used. The aging buckets 1550 may be used by the chroma cache logic to store indications of cache blocks that are not currently in the "don't touch" category as described in reference to FIG. 15B.

Figure 17:
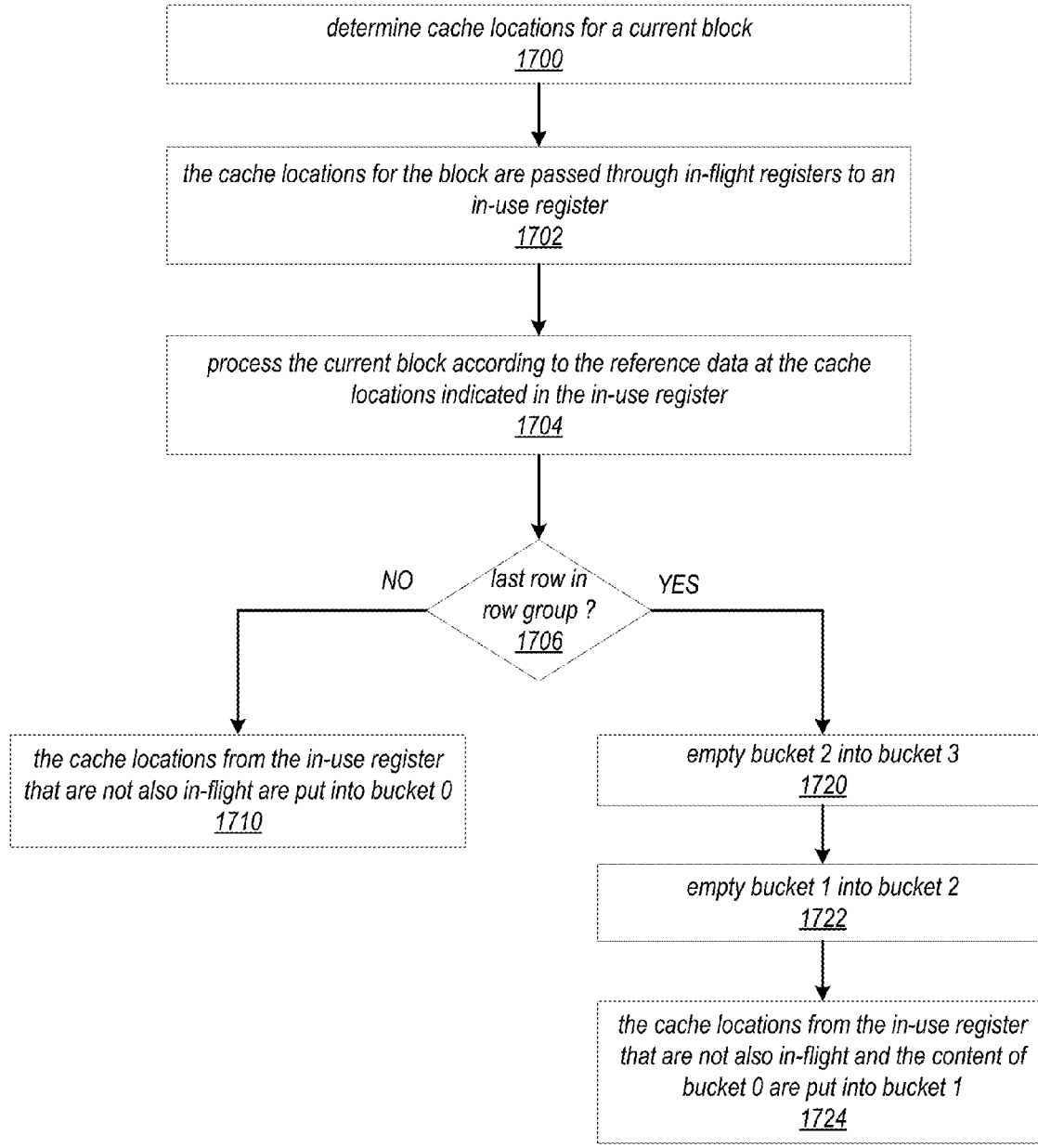
FIG. 17 is a flowchart of a method for aging cache blocks in a chroma cache, according to at least some embodiments of a replacement policy.

As indicated at 1704 of FIG. 17, the macroblock may be processed at a stage (e.g., a chroma motion compensation stage) according to the chroma reference data from the cache as indicated in the in-use register 1540B. In at least some embodiments, when done processing the macroblock at the stage (e.g., a chroma motion compensation stage) that accesses chroma reference data for the macroblock from the chroma cache, the contents of the in-use register 1540B that are not also in the in-flight registers 1540A may be pushed into the first aging bucket 1550 (bucket 0). Logical operations may be used to push indications of available cache blocks through the aging buckets 1550 at pipeline cycles (every four cycles, in some embodiments), with a first bucket (bucket 0) being filled with the in-use register 1540B contents that are not also in the in-flight registers 1540A, bucket 1 filled according to the content of bucket 0, and so on.

In at least some embodiments, the block processing pipeline may process the blocks of pixels from the input frame (e.g., macroblocks) according to groups of rows (e.g., in row groups each containing four rows of macroblocks). As a non-limiting example, in some embodiments, the block processing pipeline may process macroblocks in quadrows as described in the section titled Knight's order processing. In some embodiments of a replacement policy as illustrated in FIG. 17, the indications of available cache blocks may be pushed through the aging buckets 1550 according to the row groups. At 1706 of FIG. 17, if the macroblock that has completed processing is not in the last row of a row group, then the cache locations from the in-use register that are not also in-flight are put into bucket 0 as indicated at 1710; the other aging buckets 1550 (buckets 1 through 3 in this example) are not changed. Otherwise, at 1706, if the macroblock that has completed processing is in the last row of a row group, then bucket 2 is emptied into bucket 3 as indicated at 1720, and bucket 1 is emptied into bucket 2 as indicated at 1722. Finally, the cache locations from the in-use register 1540B that are not also in-flight 1540A and the content of bucket 0 are put into bucket 1, as indicated at 1724. Note that bits in a bucket are cleared when its content is aged into another bucket.

In at least some embodiments, when the chroma cache logic selects replacement candidate cache blocks from the chroma cache to which chroma cache misses are to be fetched, the last aging bucket (bucket 3) is checked first, then the next bucket (bucket 2), and so on. In at least some embodiments, each time a replacement candidate is picked from an aging bucket 1550, its corresponding bit in the bucket 1550 is cleared.

While FIGS. 8 through 17 are generally directed to providing a cache, cache logic, and a cache replacement policy for caching chroma reference data in a video encoder block processing pipeline, note that embodiments of the various cache methods and apparatus as described herein may be used in a video encoder block processing pipeline to cache other data than chroma reference data, or in various other apparatus, applications, or environments where data from an external memory may be locally cached.

10-Bit Support

Referring to FIG. 9, while not shown, some embodiments of a block processing pipeline 900 may support 10-bit memory formats in addition to 8-bit memory formats. For example, some embodiments of a block processing pipeline 900 may implement support for 10-bit processing in H.265 High Efficiency Video Encoding (HEVC) format video encoding. In these embodiments, the chroma cache architecture described in reference to FIG. 9 and the other Figures may be adapted to support 10-bit memory blocks of chroma reference data. For example, in one embodiment, the chroma cache architecture may split the chroma cache 930 into an 8-bit portion and a 2-bit portion. Only 8-bit portion is used when processing 8-bit data. When processing 10-bit data, the 8-bit portion is used, and the 2-bit portion is also enabled. The cache tags 932, the chroma cache replacement policy, and other aspects of the chroma cache architecture as described above may operate substantially the same when processing 8-bit or 10-bit chroma reference data.

Knight's Order Processing

Embodiments of block processing methods and apparatus are described in which, rather than processing blocks in a pipeline according to scan order as in conventional methods, the blocks are input to and processed in the pipeline according to an order referred to herein as "knight's order." Knight's order is in reference to a move of a chess knight piece in which the knight moves one row down and two columns to the left. Note, however, that "knight's order" as used herein more generally encompasses movements of one row down and p columns to the left, where p may be but is not necessarily 2.

Figure 18:
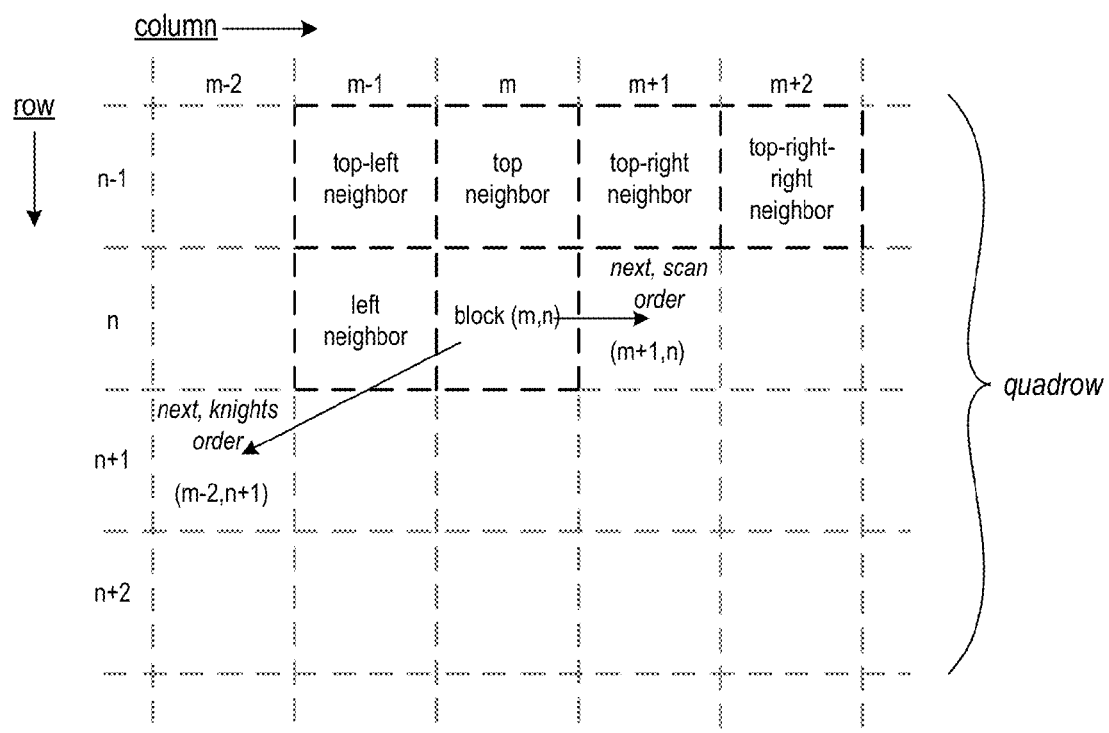
FIG. 18 shows neighbor blocks of a current block in a frame, and further illustrates a knight's order processing method for the blocks, according to at least some embodiments.

The knight's order processing method may provide spacing (one or more stages) between adjacent blocks in the pipeline, which, for example, facilitates feedback of data from a downstream stage of the pipeline processing a first block to an upstream stage of the pipeline processing a second block that depends on the data from the first block. One or more stages of a block processing pipeline may require information from one or more other neighbor blocks when processing a given block. FIG. 18 shows neighbors of a current block (m,n) from which information may be required-left (m−1,n); top (m,n−1); top-left (m−1,n−1); top-right (m+1,n−1); and top-right-right (m+2,n−1). These requirements for information from neighbor block(s) may be referred to as dependencies. For example, referring to FIG. 18, information from the left neighbor of block (m,n) may be required to perform a particular operation on the block. In the knight's order processing method, rather than inputting block (m+1, n) into the pipeline immediately after block (m,n), the next block input to the pipeline is block (m−2, n+1). Inputting the blocks into the pipeline in knight's order rather than scan order provides spacing (e.g., one or more stages) between adjacent blocks on a row in the pipeline.

In at least some embodiments of the knight's order processing method, the rows of blocks in the input frame may be divided into sets of four rows, referred to herein as quadrows, with the knight's order processing method constrained by the quadrow boundaries. Referring to FIG. 18, when using quadrow boundaries with knight's order processing block (m−1,n) will be four stages downstream when block (m,n) is input to the pipeline, and block (m,n) will be four stages downstream when block (m+1,n) is input to the pipeline. Thus, blocks that are adjacent on a row will be spaced four stages apart in the pipeline. Thus, at stages in which operations are performed on a block that depend on left neighbor information, the information for the left neighbor is more likely to be readily available with less latency than it would be if processing the blocks in scan order. In addition to dependencies on the left neighbor, one or more operations of a block processing method may depend on neighbor blocks from the previous (or above) row such as the top neighbor, top-left neighbor, top-right neighbor, and top-right-right neighbor blocks as shown in FIG. 18. The knight's order processing method with quadrow constraints provides locality of neighbor information that may be leveraged to provide local caching of this neighbor data at each stage in relatively small buffers.

In at least some embodiments, a basic algorithm for determining a next block to input to the pipeline according to the knight's order processing method using quadrow constraints is as follows:

If not on the bottom row of a quadrow:
The next block is two columns left, one row down (−2,+1).
Otherwise, at the bottom row of a quadrow:
The next block is seven columns right, three rows up (+7,−3).

However, the knight's order processing method may also be implemented with other spacing than two blocks left, one block down (−2,+1). For example, instead of two blocks left and one block down, the method may be implemented to go three blocks left and one block down to get the next block. As another example, the method may be implemented to go one block left and one block down (−1,+1) to get the next block. In addition, the knight's order processing method may be implemented with other row constraints than quadrow (four row) constraints. In other words, row groups of at least two rows may be used in embodiments to constrain the knight's order processing method. Assuming r as the number of rows used to constrain the knight's order processing method, the algorithm may be generalized as:

If not on the bottom row of a row group:
The next block is p columns left, one row down (−p,+1).
Otherwise, at the bottom row of a row group:
The next block is q columns right, (r−1) rows up (+q,−(r−1)).

Changing the value of p would affect the value of q, would not affect spacing between adjacent blocks from a row in the pipeline, but would affect spacing between a given block and its other neighbor blocks (e.g., its top-left, top, and top-right neighbors). In particular, note that using the spacing (−1,+1) would result in a block and its diagonal (top-right) neighbor block being concurrently processed at adjacent stages of the pipeline. Thus, a spacing of at least two blocks left may be used so that diagonally adjacent blocks are not concurrently processed at adjacent stages of the block processing pipeline. Changing the value of r would affect the value of q, would affect spacing between adjacent blocks from a row in the pipeline, and would affect spacing between the block and its other neighbor blocks (e.g., its top-left, top, and top-right neighbors).

The above algorithm for determining a next block may begin at an initial block. Upon reaching the end of a quadrow that is followed by another quadrow, the algorithm jumps to the first block of the next quadrow and then crosses over between the quadrow and the next quadrow for a few cycles, resulting in the interleaving of some blocks from the end of the quadrow with some blocks from the beginning of the next quadrow. In other words, the knight's order processing method treats the quadrows as if they were arranged end to end. To avoid complications in the algorithm and to maintain consistent spacing of blocks in the pipeline, at least some embodiments may pad the beginning of the first quadrow and the end of the last quadrow with invalid blocks. An invalid block may be defined as a block that is outside the boundary of the frame and that is input to the pipeline but that does not contain valid frame data, and thus is not processed at the stages. The algorithm for determining a next block may thus begin at an initial block, which may be either the first block in the top row of the first quadrow or an invalid block to the left of the first block in the top row of the first quadrow, proceed through all of the quadrows, and at the end of the last quadrow continue until the last block of the last quadrow has been input to the pipeline. There will be bubbles in the pipeline at the beginning and end of the frame, but the spacing of the valid blocks from the frame in the pipeline will remain consistent throughout. In some embodiments, as an alternative to padding the end of the last quadrow of a video frame with invalid blocks, the last quadrow of a video frame may be overlapped with the first row of the next video frame to be processed in the block processing pipeline.

FIGS. 19A and 19B graphically illustrate the knight's order processing method, according to at least some embodiments. For simplicity, these Figures use an example 192× 192 pixel frame divided into 144 16×16 pixel blocks, with 12 rows and 12 columns of blocks. However, it is to be noted that the knight's order processing method can be applied to input video frames of any dimensions. In FIG. 19A, an example frame is divided into rows and columns of blocks. The rows of blocks are partitioned into three quadrows including four rows each. The last three rows of the first quadrow are padded on the left with invalid blocks, and the first three rows of the last (third) quadrow are padded on the right with invalid blocks. In this example, the numbers in the blocks represent the order in which the blocks are input to the block processing pipeline according to the knight's order processing method, beginning with block 0 (the first block in the top row of the first quadrow). Block 0 is input to the first stage of the pipeline, and when the first stage is ready for another block, the method proceeds by going two columns left, one row down to get the next block for input (block 1, in FIG. 19A). This pattern is repeated until reaching the bottom of the quadrow. At the bottom of the quadrow, the method goes seven columns right, three rows up to get the next block. This continues until all of the blocks in the frame (as well as all of the invalid blocks shown in FIG. 19A) are input into the pipeline. When the end of a quadrow is reached, if there is another quadrow after the quadrow the input algorithm proceeds to the beginning of the next quadrow. In this example, after block 47 is input, the method proceeds to block 48 (the first block in the top row of the second quadrow). As shown by the dashed arrow from block 47 to the dashed rectangle labeled 48 to the right of block 44, the first block of the top row of the second quadrow (block 48) is treated as being immediately to the right of the last block of the top row of the first quadrow (block 44), and thus is reached from block 47 by going seven columns right, three columns up. In other words, the knight's order processing method treats the quadrows as if they were arranged end to end, with invalid blocks at each end, as shown in FIG. 19B. Thus, the algorithm for determining a next block remains the same across the entire frame.

In some embodiments, each row of the first quadrow may be padded with extra invalid blocks, for example with two extra invalid blocks. Instead of beginning with the first block in the top row of the first quadrow as shown in FIG. 19A, input to the pipeline may begin with the first invalid block to the left of the first block in top row of the first quadrow.

Figure 20A:
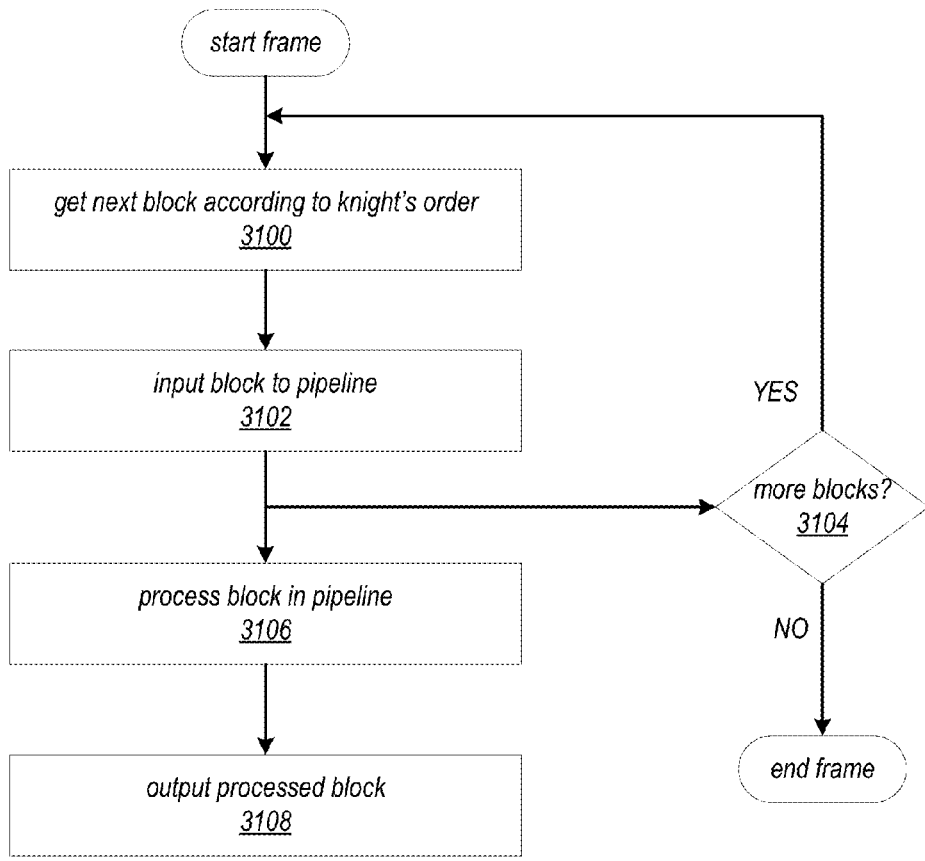
FIGS. 20A and 20B are high-level flowcharts of a knight's order processing method for a block processing pipeline, according to at least some embodiments.
Figure 20B:
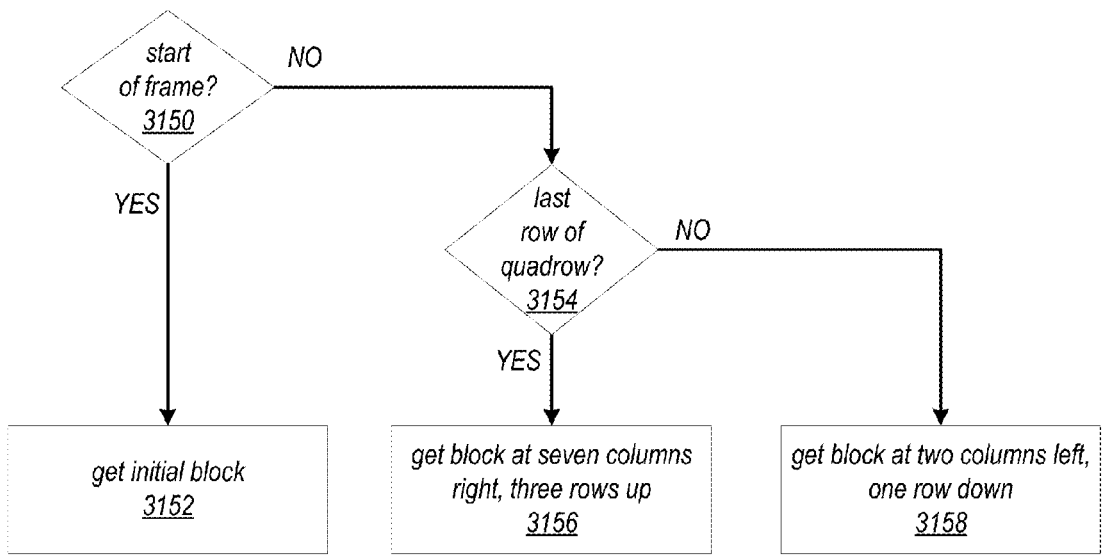

FIGS. 20A and 20B are high-level flowcharts of a knight's order processing method for a block processing pipeline, according to at least some embodiments. In FIG. 20A, as indicated at 3100, a next block is determined according to the algorithm for determining a next input block that is implemented by the knight's order processing method. As indicated at 3102, the block is input to the pipeline, for example from a memory via direct memory access (DMA). As shown by 3104, the input process of elements 3100 and 3102 continues as long as there are blocks to be processed. Each block that is input to the pipeline by elements 3100 and 3102 is processed in the pipeline, as indicated at 3106. Each block is initially input to a first stage of the pipeline, processed, output to a second stage, processed, and so on. When a block moves from a stage to a next stage of the pipeline, the stage can begin processing the next block in the pipeline. Thus, the input blocks move through the stages of the pipeline, with each stage processing one block at a time. As indicated at 3108, once a block has been processed by a last stage of the pipeline, the processed block is output, for example to a memory via direct memory access (DMA).

FIG. 20B is a flowchart of an example algorithm for determining a next input block that that may be implemented by the knight's order processing method, and expands on element 3100 of FIG. 20A. FIG. 20B assumes that the frame is divided into quadrows, and that the algorithm used to determine the next frame is two columns left, one row down (−2,+1) if not on the bottom row of a quadrow, seven columns right, three rows up (+7,−3) if on the bottom row. However, other row groupings and/or spacing algorithms may be used. At 3150, if at the start of the frame, the method gets an initial block as indicated at 3152. If this is not the start of the frame, then at 3154, if this is the last row of the quadrow, the next block is seven columns right, three rows up, as indicated at 3156. If this is not the last row of the quadrow, the next block is two columns left, one row down, as indicated at 3158.

Example Pipeline Units

FIGS. 21A through 21C are block diagrams of example pipeline processing units that may be used at the stages of a block processing pipeline that implements one or more of the block processing methods and apparatus as described herein, according to at least some embodiments. For example, one or more of pipeline units 5000A and/or 5000B as shown in FIGS. 21A and 21B may be used at each stage of the example block processing pipeline shown in FIG. 22. Note that FIGS. 21A through 21C are not intended to be limiting; a pipeline processing unit may include more or fewer components and features than those shown in the Figures.

As shown in FIG. 21A, a pipeline unit 5000A may include at least a memory 5010 and a unit core 5020. Unit core 5020 may be a component (e.g., a circuit) that is configured to perform a particular operation on or for a block, or a portion of a block, at a particular stage of the block processing pipeline. Memory 5010 may, for example, be a double-buffered memory that allows the unit core 5020 to read and process data for a block from the memory 5010 while data for a next block is being written to the memory 5010 from a previous pipeline unit.

As shown in FIG. 21B, a pipeline unit 5000B, in addition to a memory 5010 and unit core 5020 as shown in FIG. 21A, may also include a processor 5030. Processor 5030 may, for example, be a mobile or M-class processor. The processors 5030 in pipeline units 5000B of a block processing pipeline may, for example, be used to control the block processing pipeline at block boundaries. The processors 5030 in pipeline units 5000B may be configurable, for example with low-level firmware microcode, to allow flexibility in algorithms that are implemented by the block processing pipeline for various applications. In at least some embodiments, a processor 5030 of a pipeline unit 5000B in the pipeline may be configured to receive data from a processor 5030 of a previous (upstream) pipeline unit 5000B and send data to a processor 5030 of a subsequent (downstream) pipeline unit 5000B. In addition, a processor 5030 of a pipeline unit 5000B at a last stage of the pipeline may be configured to send feedback data to a processor 5030 of a pipeline unit 5000B at a first stage of the pipeline.

As shown in FIGS. 21A and 21B, a pipeline unit 5000A or 5000B may be configured to access external memory, for example according to direct memory access (DMA). In addition, a pipeline unit 5000A or 5000B may be configured to pass information back to one or more previous (upstream) stages of the pipeline and/or to receive information passed back from one or more subsequent (downstream) stages of the pipeline. In addition, a pipeline unit 5000A or 5000B may be configured to pass information forward to one or more subsequent (downstream) stages of the pipeline and/or to receive information passed forward from one or more previous (upstream) stages of the pipeline.

As shown in FIG. 21C, two or more units 5000A as shown in FIG. 21A may be grouped together and configured to perform an operation in the pipeline. A single processor 5030 may be used to control and/or configure the pipeline units 5000A.

Example Block Processing Pipeline

FIG. 22 is a high-level block diagram of general operations in an example block processing method 6000 for H.264 encoding that may be implemented in stages by a block processing pipeline that may implement one or more of the block processing methods and apparatus as described herein, according to at least some embodiments. A block processing pipeline that implements the block processing method 6000 may, for example, be implemented as a component of an H.264 video encoder apparatus that is configured to convert input video frames from an input format into H.264/Advanced Video Coding (AVC) format as described in the H.264/AVC standard. The H.264/AVC standard is published by ITU-T in a document titled "ITU-T Recommendation H.264: Advanced video coding for generic audiovisual services", which may be referred to as the H.264 Recommendation. An example input video format is 1080p (1920× 1080 pixels, 2.1 megapixels) encoded in YCbCr color space. However, other input video formats may be encoded into H.264 using embodiments of the pipeline in a video encoder apparatus.

Figure 24:
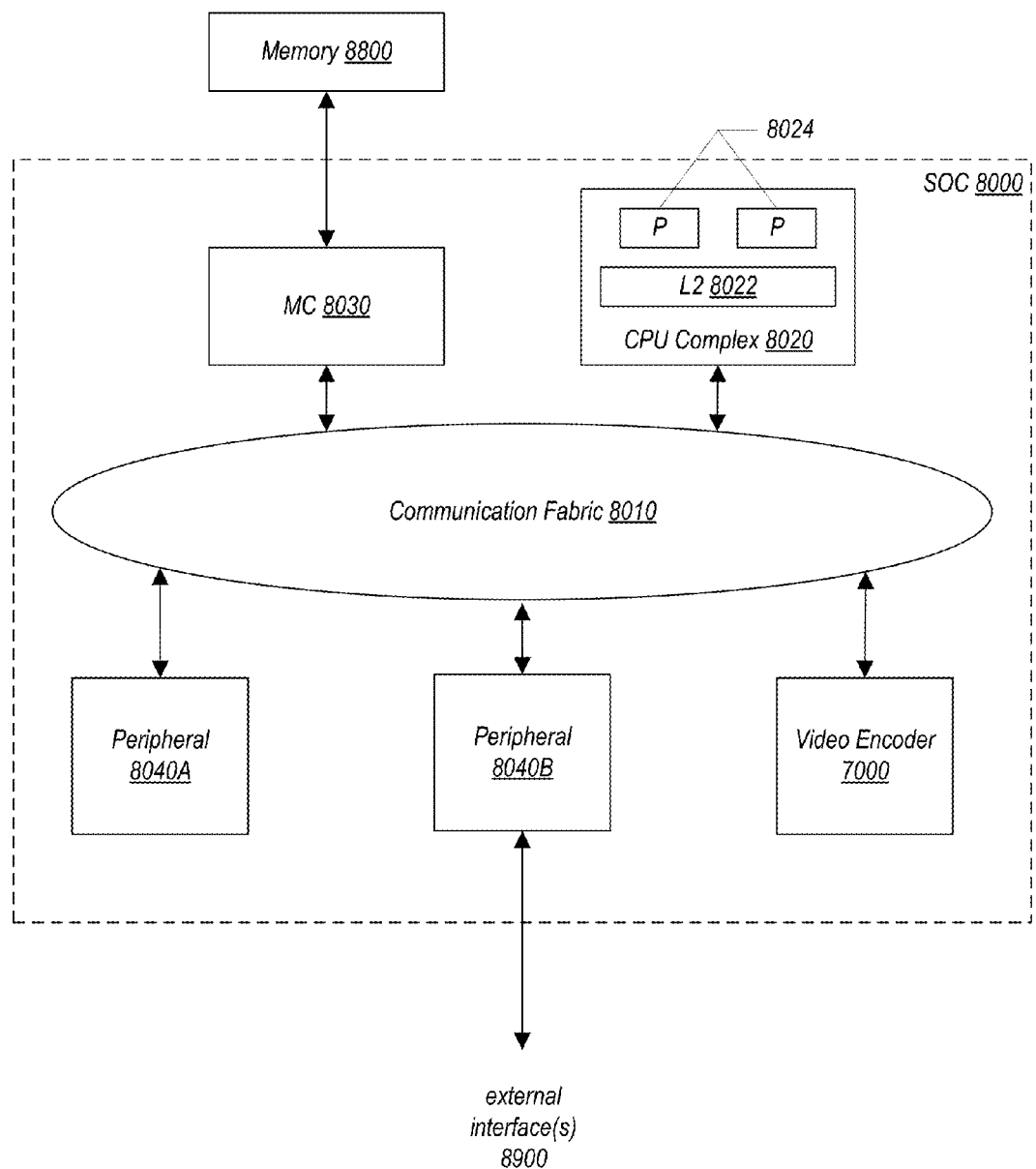
FIG. 24 is a block diagram of one embodiment of a system on a chip (SOC).

The video encoder apparatus may, for example, be implemented as an integrated circuit (IC) or as a subsystem on an IC such as a system-on-a-chip (SOC). In at least some embodiments, the video encoder apparatus may include at least a pipeline component, a processor component (e.g., a low-power multicore processor), and a bus subsystem or fabric that interconnects the functional components of the apparatus. The processor component of the video encoder apparatus may, for example, perform frame-level control of the pipeline such as rate control, perform pipeline configuration, and interface with application software via a driver. The pipeline component may implement multiple processing stages each configured to perform a portion or all of one or more of the operations as shown in FIG. 22, each stage including one or more processing units. At least one of the processing units in the pipeline may include a processor component (e.g., an M-class processor) that may, for example, configure parameters of the processing unit at the respective stage at the macroblock level. The video encoder apparatus may include other functional components or units such as memory components, as well as external interfaces to, for example, one or more video input sources and external memory. Example video input sources to the video encoder apparatus may include one or more of, but are not limited to, a video camera for raw video input processing, a decoder apparatus for re-encoding/transcoding, a flash or other memory, and a JPEG decoder. An example video encoder apparatus is illustrated in FIG. 23. An example SOC that includes a video encoder apparatus is illustrated in FIG. 24. While embodiments are generally described in relation to hardware implementations of a block processing pipeline that implements the block processing method 6000 with knight's order processing, note that the block processing method 6000 with knight's order processing may be implemented by a block processing pipeline implemented in software.

A pipeline that implements the method 6000 as shown in FIG. 22 may process 16×16 pixel macroblocks from input video frames according to the H.264 standard, each macroblock including two or more blocks or partitions that may be processed separately at stages of the pipeline. The input video frames may, for example, be encoded in YCbCr color space; each macroblock may be composed of separate blocks of chroma and luma elements that may be processed separately at the stages of the pipeline. A pipeline that implements the block processing method 6000 may receive input macroblocks from and output processed macroblocks to a memory. The memory may include memory of the video encoder apparatus and/or memory external to the video encoder apparatus. In at least some embodiments, the memory may be accessed by the pipeline as necessary, for example via direct memory access (DMA). In at least some embodiments, the memory may be implemented as a multi-level memory with a cache memory implemented between the pipeline and an external memory. For example, in some implementations, one or more quadrows may be read from an external memory and cached to the cache memory for access by the pipeline to reduce the number of reads to an external memory.

The general operations of the example H.264 video encoder method 6000 as shown in FIG. 22 that may be performed in stages by a pipeline, as well as general data flow through the pipeline, are briefly described below. Each of the general operations of the method 6000 may be implemented by one or more pipeline units at one or more stages of the pipeline. Example pipeline units are illustrated in FIGS. 21A through 21C. Also note that each general operation shown in FIG. 22 may be subdivided into two or more operations that may be implemented by pipeline units at one, two, or more stages of the pipeline. However, two or more of the operations shown in FIG. 22 may be performed at the same stage of the pipeline. Each stage in the pipeline processes one macroblock at a time, and thus two or more of the operations may simultaneously operate on the same macroblock that is currently at the respective stage. Note that a pipeline may perform more, fewer, or other operations than those shown in FIG. 22 and described below.

Macroblock Input

In at least some embodiments, macroblock input 6002 may be performed by an initial stage of the pipeline. In at least some embodiments, macroblock input 6002 receives luma and chroma pixels from a memory, for example via DMA, computes statistics on input pixels that are used by firmware in downstream stages of the pipeline, and buffers input macroblocks to enable firmware look ahead. The input macroblock pixel data and corresponding statistics are buffered and sent to one or more downstream stages of the pipeline that implement intra-frame and inter-frame estimation 6010 operations. In at least some embodiments, an input buffer of up to 16 macroblocks is maintained for input pixels and statistics. In at least some embodiments, the macroblock pixel data and corresponding statistics may be input to downstream stages of the pipeline according to a knight's order input algorithm as previously described in the section titled Knight's order processing.

In at least some embodiments, macroblock input 6002 reads neighbor data from the bottom row of a previous quadrow from memory at quadrow boundaries and passes the neighbor data to at least one downstream stage.

Intra-Frame and Inter-Frame Estimation

Intra-frame and inter-frame estimation 6010 operations may determine blocks of previously encoded pixels to be used in encoding macroblocks input to the pipeline. In H.264 video encoding, each macroblock can be encoded using blocks of pixels that are already encoded within the current frame. The process of determining these blocks may be referred to as intra-frame estimation, or simply intra-estimation. However, macroblocks may also be encoded using blocks of pixels from one or more previously encoded frames (referred to as reference frames). The process of finding matching pixel blocks in reference frames may be referred to as inter-frame estimation, or more generally as motion estimation. Intra-frame and inter-frame estimation 6010 operations may be subdivided into two or more sub-operations that may be performed at one, two, or more stages of the pipeline, with one or more components or pipeline units at each stage configured to perform a particular sub-operation.

In at least some embodiments, macroblock input 6002 reads neighbor data from the bottom row of a previous quadrow from memory at quadrow boundaries and passes the neighbor data to intra-frame and inter-frame estimation 6010, for example to an intra-frame estimation component. In addition, motion compensation and reconstruction 6030, for example a luma reconstruction component, may pass neighbor data as feedback to intra-frame and inter-frame estimation 6010, for example to the intra-frame estimation component.

Motion Estimation

In at least some embodiments, to perform motion estimation, the pipeline may include one instance of a motion estimation engine for each reference frame to be searched. Each motion estimation engine searches only one reference frame. In at least some embodiments, each motion estimation engine may include a low resolution motion estimation component, a full pixel motion estimation component, and a subpixel motion estimation component. In at least some embodiments, the three components of each of the motion estimation engines may be implemented at different stages of the pipeline. In at least some embodiments, each motion estimation engine may also include a memory component that reads and stores reference frame data from a memory as needed. In at least some embodiments, a single instance of a processor manages all instances of the motion estimation engine. In at least some embodiments, the processor may determine one or more candidates using predicted and co-located motion vectors and input the candidates to the full pixel motion estimation components of the motion estimation engines.

In at least some embodiments, the low resolution motion estimation component of each motion estimation engine performs an exhaustive search on a scaled-down, low resolution version of a respective reference frame to generate candidates. In at least some embodiments, the full pixel motion estimation component performs a search on full size pixels using candidates from the low resolution motion estimation component. In at least some embodiments, the subpixel motion estimation component performs a search on half and quarter pixels using best candidates received from the full pixel motion estimation component. In some embodiments, full pixel motion estimation and subpixel motion estimation may be disabled based on results of a direct mode estimation performed at an upstream stage of the pipeline. In at least some embodiments, each motion estimation engine outputs results data to mode decision 6020.

In at least some embodiments, motion estimation may also include a direct mode estimation component that receives co-located and spatial motion vector data and computes a direct/skip mode cost, which it provides to mode decision 6020. Based on the results, the direct mode estimation component may disable full pixel motion estimation and subpixel motion estimation.

Intra Estimation

In at least some embodiments, an intra estimation component of the pipeline performs intra mode selection to determine blocks of pixels already encoded within the current frame that may be used in encoding a current macroblock. In at least some embodiments, the intra estimation component performs intra mode selection only for luma. In these embodiments, Chroma intra estimation is performed by a chroma reconstruction component at a downstream stage of the pipeline. In at least some embodiments, the intra estimation component may perform intra estimation independently for each of two or more blocks or partitions (e.g., 4×4, 8×8, 4×8, 8×4, 16×8, and/or 8×16 blocks) in a macroblock. For each block, prediction pixels are first extracted from neighbor blocks (neighbor blocks can be outside the current macroblock in the frame or within the current macroblock). For each prediction mode in the current block, the cost of the current mode is evaluated by creating a prediction block from neighbor pixels, computing a mode cost, and comparing the mode cost to a minimum cost for that block. Once all prediction modes are evaluated and the best mode is determined, reconstruction may be performed for the best mode so that reconstructed pixels can be used to predict future blocks within the macroblock. The intra estimation component may pass best intra mode information to mode decision 6020.

In at least some embodiments, macroblock input 6002 reads neighbor data from the bottom row of a previous quadrow from memory at quadrow boundaries and passes the neighbor data to the intra estimation component. In at least some embodiments, at least one downstream stage (e.g., a luma reconstruction component at a downstream stage) may pass neighbor data back to the intra estimation component.

Mode Decision

In at least some embodiments, mode decision 6020 may be implemented by a mode decision component at a stage of the pipeline that is downstream of the stage(s) that implement intra-frame and inter-frame estimation 6010 operations. However, in some embodiments, mode decision 6020 operations may be subdivided into two or more sub-operations that may be performed at one, two, or more stages of the pipeline, with one or more components or pipeline units at each stage configured to perform a particular sub-operation. In at least some embodiments, the mode decision 6020 component receives the best intra mode from intra estimation, direct/skip mode cost from direct mode estimation, and motion vector candidates from the motion estimation engines. In at least some embodiments, the mode decision component computes additional costs for bi-directional modes and determines the best macroblock type, including macroblock partitions, sub-partitions, prediction direction and reference frame indices. In at least some embodiments, the mode decision 6020 component also performs all motion vector prediction. The motion vector prediction results may be used when estimating motion vector rate during mode decision. In at least some embodiments, the motion vector prediction results may also be fed back from the mode decision 6020 component to motion estimation, for example for use in direct mode estimation and motion vector rate estimation.

Motion Compensation and Reconstruction

In at least some embodiments, motion compensation and reconstruction 6030 operations may be subdivided into two or more sub-operations that may be performed at one, two, or more stages of the pipeline, with one or more components or pipeline units at each stage configured to perform a particular sub-operation. For example, in some embodiments, motion compensation and reconstruction 6030 may be subdivided into luma motion compensation and reconstruction and chroma motion compensation and reconstruction. In at least some embodiments, each of these sub-operations of motion compensation and reconstruction 6030 may be performed by one or more components or pipeline units at one or more stages of the pipeline.

Luma Motion Compensation and Reconstruction

In at least some embodiments, a luma motion compensation component of the pipeline receives the best mode and corresponding motion vectors from mode decision 6020. As previously noted, each motion estimation engine may include a memory component that reads and stores reference frame data from a memory. If the best mode is inter-predicted, the luma motion compensation component requests reference frame macroblocks from the motion estimation engine corresponding to the motion vectors. The motion estimation engine returns subpixel interpolated 4×4 or 8×8 blocks depending on the request size. The luma motion compensation component then combines the blocks into prediction macroblocks. The luma motion compensation component then applies a weighted prediction to the prediction macroblocks to create the final macroblock predictor that is then passed to the luma reconstruction component.

In at least some embodiments, a luma reconstruction component of the pipeline performs macroblock reconstruction for luma, including intra prediction (in at least some embodiments, the luma motion compensation component performs inter prediction), forward transform and quantization (FTQ), and inverse transform and quantization (ITQ).

In at least some embodiments, based on the best mode from mode decision 6020, either an inter prediction macroblock is passed from the luma motion compensation component or intra prediction is performed by the luma reconstruction component to generate a prediction block. In intra mode, the prediction is performed in block (scan) order since reconstructed pixels from neighbor blocks are needed for prediction of future blocks. The input block is subtracted from the prediction block to generate a residual block. This residual pixel data is transformed and quantized by an FTQ technique implemented by the luma reconstruction component. The coefficient data is sent to an ITQ technique implemented by the luma reconstruction component, and may also be sent downstream to CAVLC encoding. The ITQ technique generates a reconstructed residual pixel block. The prediction block is added to the residual block to generate the reconstructed block. Reconstructed pixels may be passed downstream to a deblocking filter. In at least some embodiments, reconstructed pixels may also be passed back to an intra-frame estimation component of intra-frame and inter-frame estimation 1410 for prediction of future blocks inside the current macroblock.

Chroma Motion Compensation and Reconstruction

In at least some embodiments, chroma reconstruction is performed in two stages. In the first stage, chroma reference blocks needed for inter prediction are read from memory based on input macroblock type, motion vectors, and reference frame index. Subpixel interpolation and weighted prediction is then applied to generate a prediction macroblock. In the second stage, chroma intra prediction and chroma intra/inter FTQ/ITQ is performed. This allows one additional pipeline stage to load chroma prediction pixel data. Since chroma pixels are not searched by motion estimation, the chroma prediction data is read from external memory and may have large latency. In at least some embodiments, a chroma motion compensation component performs the first stage, while a chroma reconstruction component performs the second stage.

In at least some embodiments, the chroma motion compensation component generates a prediction block including subpixel interpolation for Cb and Cr chroma blocks; the size is based on the partition size and chroma formats. A full size chroma block is 8×8, 8×16, or 16×16 pixels for chroma formats 4:2:0, 4:2:2 and 4:4:4, respectively. In at least some embodiments, the chroma motion compensation component may prefetch and cache chroma prediction pixels from an external (to the pipeline) memory. In at least some embodiments, reference data may be read based on mode decision 6020 results. The chroma motion compensation component performs subpixel interpolation to generate a prediction block. Mode decision 6020 provides the macroblock type and sub-types, reference frame index per partition, and corresponding motion vectors. The prediction is output to the chroma reconstruction component.

In at least some embodiments, the chroma reconstruction component performs chroma prediction, chroma intra estimation and chroma reconstruction for inter and intra modes. For chroma formats 4:2:0 and 4:2:2, intra chroma estimation and prediction is performed. In at least some embodiments, chroma intra estimation is performed at this stage rather than at intra-frame and inter-frame estimation 6010 so that reconstructed pixels can be used during the estimation process. In at least some embodiments, if the best mode is in intra, intra chroma estimation may be performed. based on the best intra chroma mode, and intra prediction may be performed using one of four intra chroma modes. For inter macroblocks, inter chroma prediction pixels are received from chroma motion compensation. For chroma format 4:4:4, the luma intra prediction modes are used to generate the chroma block prediction, and inter chroma prediction is performed in the same manner as for luma. Therefore, chroma reconstruction conceptually includes 4:2:0 and 4:2:2 chroma reconstruction and luma reconstruction used to reconstruct chroma in 4:4:4 chroma format.

CAVLC Encode and Deblocking

In at least some embodiments, CAVLC encoding and deblocking may be performed by one or more components at a last stage of the pipeline. In at least some embodiments, a deblocking filter component of the pipeline receives reconstructed luma and chroma pixels from the chroma reconstruction component and performs deblocking filtering according to the H.264 Recommendation. Results may be output to a memory.

In at least some embodiments, a CAVLC encode component of the pipeline receives at least luma and chroma quantized coefficients, neighbor data, and chroma reconstruction results from the chroma reconstruction component and generates a CAVLC (context-adaptive variable-length coding) encoded output stream to a memory.

In at least some embodiments, the deblocking filter component and the CAVLC encode component write neighbor data for the bottom row of a quadrow to a memory at quadrow boundaries. For the top row of a next quadrow, macroblock input 6002 may then read this neighbor data from the memory at quadrow boundaries and pass the neighbor data to at least one downstream stage of the pipeline.

Transcoder

In at least some embodiments, a transcoding operation may be performed by a transcoder 6050. The transcoder may be implemented as a functional component of the pipeline or as a functional component that is external to the pipeline. In at least some embodiments, the transcoder 6050 may perform a memory-to-memory conversion of a CAVLC (context-adaptive variable-length coding) encoded stream output by the pipeline to a CABAC (context-adaptive binary arithmetic coding) encoded stream.

In at least some embodiments, the pipeline may encode in an order other than scan order, for example knight's order as previously described herein. However, ultimately, the H.264 video encoder's encoded bit stream should be transmitted in conventional macroblock scan order. In at least some embodiments, re-ordering the macroblock output from knight's order to scan order is accomplished by the CAVLC encode component writing encoded data to four different output buffers, each output buffer corresponding to a macroblock row. At the end of a quadrow, each row buffer will contain a scan order stream of encoded macroblocks for a respective row. Transcoder 6050 handles stitching the start and end of each row to generate a continuous stream at macroblock row boundaries. In at least some embodiments, the pipeline may embed metadata in the CAVLC output stream to facilitate stitching of the rows by the transcoder 6050.

Example Video Encoder Apparatus

FIG. 23 is a block diagram of an example video encoder apparatus 7000, according to at least some embodiments. The video encoder apparatus 7000 may, for example, be implemented as an integrated circuit (IC) or as a subsystem on an IC such as a system-on-a-chip (SOC). In at least some embodiments, the video encoder apparatus 7000 may include a pipeline 7040 component, a processor 7010 component (e.g., a low-power multicore processor), a memory management unit (MMU) 7020, DMA 7030, and an interconnect 7050 such as a bus subsystem or fabric that interconnects the functional components of the apparatus. The processor 7010 component of the video encoder apparatus 7000 may, for example, perform frame-level control of the pipeline 7040 such as rate control, perform pipeline 7040 configuration including configuration of individual pipeline units within the pipeline 7040, and interface with application software via a driver, for example for video encoder 7000 configuration. The MMU 7020 may serve as an interface to external memory, for example for streaming video input and/or output. Pipeline 7040 component may access memory through MMU 7020 via DMA 7030. In some embodiments, the video encoder apparatus 7000 may include other functional components or units not shown in FIG. 23, or fewer functional components than those shown in FIG. 23. An example block processing method that may be implemented by pipeline 7040 component is shown in FIG. 22. An example a system-on-a-chip (SOC) that may include at least one video encoder apparatus 7000 is illustrated in FIG. 24.

Example System on a Chip (SOC)

Turning now to FIG. 24, a block diagram of one embodiment of a system-on-a-chip (SOC) 8000 that may include at least one instance of a video encoder apparatus including a block processing pipeline that may implement one or more of the block processing methods and apparatus as illustrated in FIGS. 3 through 23. SOC 8000 is shown coupled to a memory 8800. As implied by the name, the components of the SOC 8000 may be integrated onto a single semiconductor substrate as an integrated circuit "chip." In some embodiments, the components may be implemented on two or more discrete chips in a system. However, the SOC 8000 will be used as an example herein. In the illustrated embodiment, the components of the SOC 8000 include a central processing unit (CPU) complex 8020, on-chip peripheral components 8040A-8040B (more briefly, "peripherals"), a memory controller (MC) 8030, a video encoder 7000 (which may itself be considered a peripheral component), and a communication fabric 8010. The components 8020, 8030, 8040A-8040B, and 7000 may all be coupled to the communication fabric 8010. The memory controller 8030 may be coupled to the memory 8800 during use, and the peripheral 8040B may be coupled to an external interface 8900 during use. In the illustrated embodiment, the CPU complex 8020 includes one or more processors (P) 8024 and a level two (L2) cache 8022.

The peripherals 8040A-8040B may be any set of additional hardware functionality included in the SOC 8000. For example, the peripherals 8040A-8040B may include video peripherals such as an image signal processor configured to process image capture data from a camera or other image sensor, display controllers configured to display video data on one or more display devices, graphics processing units (GPUs), video encoder/decoders, scalers, rotators, blenders, etc. The peripherals may include audio peripherals such as microphones, speakers, interfaces to microphones and speakers, audio processors, digital signal processors, mixers, etc. The peripherals may include peripheral interface controllers for various interfaces 8900 external to the SOC 8000 (e.g. the peripheral 8040B) including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

More particularly in FIG. 24, SOC 8000 may include at least one instance of a video encoder 7000 component, for example a video encoder 7000 as illustrated in FIG. 23 that includes a block processing pipeline 7040 component that implements a block processing method 6000 as illustrated in FIG. 22. Video encoder 7000 may, for example, be an H.264 video encoder apparatus that may be configured to convert input video frames from an input format into H.264/Advanced Video Coding (AVC) format as described in the H.264/AVC standard. The block processing pipeline 7040 may implement one or more of the block processing methods and apparatus as described herein in relation to FIGS. 3 through 22.

The CPU complex 8020 may include one or more CPU processors 8024 that serve as the CPU of the SOC 8000. The CPU of the system includes the processor(s) that execute the main control software of the system, such as an operating system. Generally, software executed by the CPU during use may control the other components of the system to realize the desired functionality of the system. The processors 8024 may also execute other software, such as application programs. The application programs may provide user functionality, and may rely on the operating system for lower level device control. Accordingly, the processors 8024 may also be referred to as application processors. The CPU complex 8020 may further include other hardware such as the L2 cache 8022 and/or and interface to the other components of the system (e.g. an interface to the communication fabric 8010). Generally, a processor may include any circuitry and/or microcode configured to execute instructions defined in an instruction set architecture implemented by the processor. The instructions and data operated on by the processors in response to executing the instructions may generally be stored in the memory 8800, although certain instructions may be defined for direct processor access to peripherals as well. Processors may encompass processor cores implemented on an integrated circuit with other components as a system on a chip (SOC 8000) or other levels of integration. Processors may further encompass discrete microprocessors, processor cores and/or microprocessors integrated into multichip module implementations, processors implemented as multiple integrated circuits, etc.

The memory controller 8030 may generally include the circuitry for receiving memory operations from the other components of the SOC 8000 and for accessing the memory 8800 to complete the memory operations. The memory controller 8030 may be configured to access any type of memory 8800. For example, the memory 8800 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.). The memory controller 8030 may include queues for memory operations, for ordering (and potentially reordering) the operations and presenting the operations to the memory 8800. The memory controller 8030 may further include data buffers to store write data awaiting write to memory and read data awaiting return to the source of the memory operation. In some embodiments, the memory controller 8030 may include a memory cache to store recently accessed memory data. In SOC implementations, for example, the memory cache may reduce power consumption in the SOC by avoiding reaccess of data from the memory 8800 if it is expected to be accessed again soon. In some cases, the memory cache may also be referred to as a system cache, as opposed to private caches such as the L2 cache 8022 or caches in the processors 8024, which serve only certain components. Additionally, in some embodiments, a system cache need not be located within the memory controller 8030.

In an embodiment, the memory 8800 may be packaged with the SOC 8000 in a chip-on-chip or package-on-package configuration. A multichip module configuration of the SOC 8000 and the memory 8800 may be used as well. Such configurations may be relatively more secure (in terms of data observability) than transmissions to other components in the system. Accordingly, protected data may reside in the memory 8800 unencrypted, whereas the protected data may be encrypted for exchange between the SOC 8000 and external endpoints.

The communication fabric 8010 may be any communication interconnect and protocol for communicating among the components of the SOC 8000. The communication fabric 8010 may be bus-based, including shared bus configurations, cross bar configurations, and hierarchical buses with bridges. The communication fabric 8010 may also be packet-based, and may be hierarchical with bridges, cross bar, point-to-point, or other interconnects.

It is noted that the number of components of the SOC 8000 (and the number of subcomponents for those shown in FIG. 24, such as within the CPU complex 8020) may vary from embodiment to embodiment. There may be more or fewer of each component/subcomponent than the number shown in FIG. 24.

Example System

Figure 25:
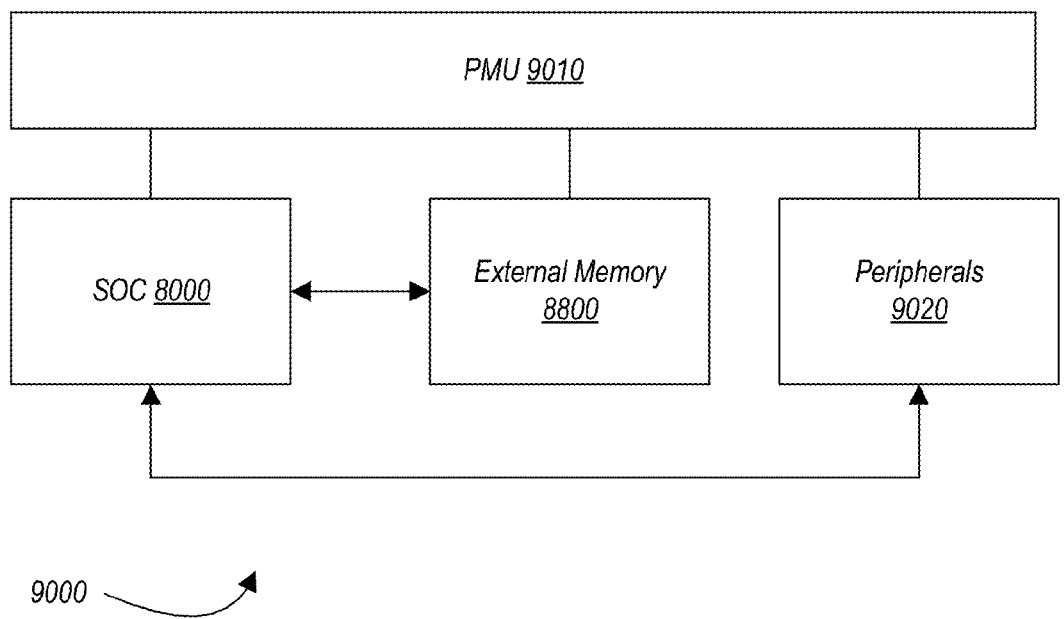
FIG. 25 is a block diagram of one embodiment of a system.

FIG. 25 a block diagram of one embodiment of a system 9000. In the illustrated embodiment, the system 9000 includes at least one instance of the SOC 8000 coupled to one or more external peripherals 9020 and the external memory 8800. A power management unit (PMU) 9010 is provided which supplies the supply voltages to the SOC 8000 as well as one or more supply voltages to the memory 8800 and/or the peripherals 9020. In some embodiments, more than one instance of the SOC 8000 may be included (and more than one memory 8800 may be included as well).

The peripherals 9020 may include any desired circuitry, depending on the type of system 9000. For example, in one embodiment, the system 9000 may be a mobile device (e.g. personal digital assistant (PDA), smart phone, etc.) and the peripherals 9020 may include devices for various types of wireless communication, such as wifi, Bluetooth, cellular, global positioning system, etc. The peripherals 9020 may also include additional storage, including RAM storage, solid state storage, or disk storage. The peripherals 9020 may include user interface devices such as a display screen, including touch display screens or multitouch display screens, keyboard or other input devices, microphones, speakers, etc. In other embodiments, the system 9000 may be any type of computing system (e.g. desktop personal computer, laptop, workstation, net top etc.).

The external memory 8800 may include any type of memory. For example, the external memory 8800 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 8800 may include one or more memory modules to which the memory devices are mounted, such as single inline memory modules (SIMMs), dual inline memory modules (DIMMs), etc. Alternatively, the external memory 8800 may include one or more memory devices that are mounted on the SOC 8000 in a chip-on-chip or package-on-package implementation.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An image processing apparatus, comprising:
  a block processing pipeline comprising a plurality of stages each configured to perform one or more operations on blocks of pixels from an input frame passing through the pipeline;
  a memory configured to store one or more reference frames;
  a cache memory comprising a plurality of cache blocks for caching reference data prefetched from the memory at one or more upstream stages of the pipeline for access by a downstream stage of the pipeline; and
  wherein the block processing pipeline is configured to:
    generate a plurality of reference motion vectors for a current block of pixels from the input frame, wherein each reference motion vector indicates a memory block in one of the one or more reference frames;
    check cache tags for the cache blocks according to the reference motion vectors to determine cache hits and cache misses for the reference motion vectors; and
    for each cache miss:
      select a cache block according to a replacement policy;
      issue a read request to prefetch a memory block of reference data indicated by the respective reference motion vector into the selected cache block; and
      store the respective reference motion vector as a cache tag for the respective cache block.

2. The apparatus as recited in claim 1, wherein, to generate the plurality of reference motion vectors for the current block, the block processing pipeline is configured to derive the reference motion vectors from one or more motion vectors for the current block each indicating a respective pixel region in one of the reference frames relative to the current block.

3. The apparatus as recited in claim 1, wherein the one or more reference frames are stored in the memory according to a tile format that stores reference data from processed blocks of a frame in corresponding tiles, wherein each tile includes two or more contiguous memory blocks in the memory, and wherein each reference motion vector comprises an indication of a particular one of the one or more reference frames, an indication of a particular tile in the indicated reference frame, and an indication of a particular memory block in the indicated tile.

4. The apparatus as recited in claim 1, wherein the reference data is chroma reference data for one of chroma 4:4:4, 4:2:2, or 4:2:0 formats.

5. The apparatus as recited in claim 4, wherein the downstream stage of the pipeline is configured to perform chroma motion compensation for a block of pixels at the stage according to the chroma reference data for the block accessed from respective cache blocks in the cache memory.

6. The apparatus as recited in claim 1, further comprising a plurality of registers each configured to store indications of cache blocks in the cache memory corresponding to a respective block of pixels from the input frame currently at a respective stage of the pipeline, wherein the plurality of registers includes one or more in-flight registers that indicate cache blocks corresponding to one or more blocks of pixels from the input frame at the one or more upstream stages of the pipeline and an in-use register that indicates cache blocks corresponding to a block of pixels from the input frame currently being processed at the downstream stage of the pipeline.

7. The apparatus as recited in claim 6, wherein the block processing pipeline is further configured to set content of a first register of the plurality of registers according to the cache blocks corresponding to the current block of pixels from the input frame, wherein the cache blocks corresponding to the current block comprise cache blocks indicated by the cache hits and cache blocks selected for the cache misses for the current block.

8. The apparatus as recited in claim 6, wherein the one or more in-flight registers and the in-use register collectively indicate cache blocks in the cache that include reference data needed to process blocks of pixels from the input frame currently in the pipeline, wherein the cache blocks indicated by the in-flight registers and the in-use register are not selected as cache blocks for the reference motion vectors of the current block by the replacement policy.

9. The apparatus as recited in claim 6, further comprising two or more registers configured as buckets for aging the cache blocks in the cache memory, wherein indications of the cache blocks that cache reference data are aged through the buckets from a first bucket to a last bucket, and wherein the replacement policy selects cache blocks for cache misses from the last bucket first and from the first bucket last.

10. The apparatus as recited in claim 9, wherein the block processing pipeline is further configured to age the cache blocks in the buckets by setting the content of each bucket after the first bucket according to the content of the previous bucket, and setting content of the first bucket to indicate the cache blocks indicated by the in-flight register that are not also indicated by the one or more in-flight registers.

11. The apparatus as recited in claim 6, further comprising a plurality of buckets, wherein cache blocks in the cache memory are aged through the buckets from a first bucket to a last bucket, wherein the apparatus is configured to process blocks of pixels from the input frame in the block processing pipeline according to row groups each comprising a plurality of rows of blocks from the frame, and wherein the block processing pipeline is further configured to:

process a block of pixels from the input frame at the downstream stage of the pipeline;

when the block of pixels is from the last row of a row group, set content of a first bucket to indicate the cache blocks indicated by the in-flight register that are not also indicated by the one or more in-flight registers; and when the block of pixels is not on the last row of a row group:

empty content of a second bucket into a third bucket; and set content of the second bucket to indicate content of the first bucket and the content of the in-flight register that is not also in the one or more in-flight registers.

12. An image processing method, comprising:

inputting blocks of pixels from an input frame to a block processing pipeline comprising a plurality of stages each configured to perform one or more operations on a block of pixels, wherein a downstream stage of the pipeline is configured to process the blocks of pixels according to reference data from one or more reference frames;

caching, by the block processing pipeline, blocks of reference data from the reference frames into a cache memory comprising a plurality of cache locations, each cache location configured to store a block of reference data;

generating, by an upstream stage of the pipeline, one or more reference motion vectors for a current block of pixels from the input frame, wherein each reference motion vector indicates a block of reference data in one of one or more reference frames;

for at least one of the reference motion vectors for the current block:

determining that the block of reference data indicated by the reference motion vector is not in the cache memory;

determining a cache location for the reference motion vector according to a replacement policy; and generating a read request according to the reference motion vector to prefetch the block of reference data indicated by the reference motion vector into the determined cache location.

13. The method as recited in claim 12, further comprising:

storing reference motion vectors as cache tags for the cache locations; and checking the cache tags according to the one or more reference motion vectors to determine cache hits and cache misses for the one or more reference motion vectors.

14. The method as recited in claim 12, wherein the one or more reference frames are stored in the memory according to a tile format that stores reference data from processed blocks of a frame in corresponding tiles, wherein each tile includes two or more contiguous memory blocks in the memory, and wherein each reference motion vector comprises an indication of a particular one of the one or more reference frames, an indication of a particular tile in the indicated reference frame, and an indication of a particular memory block in the indicated tile.

15. The method as recited in claim 12, wherein the reference data is chroma reference data for one of chroma 4:4:4, 4:2:2, or 4:2:0 formats, the method further comprising the downstream stage performing chroma motion compensation for each block of pixels passing through the pipeline according to the chroma reference data for the blocks accessed from the cache memory.

16. The method as recited in claim 12, wherein said determining a cache location for the reference motion vector according to a replacement policy comprises selecting the cache location from a plurality of aging buckets, wherein indications of the cache locations that store the reference data are aged through the buckets from a first bucket to a last bucket, and wherein the replacement policy selects cache locations from the last bucket first and from the first bucket last.

17. The method as recited in claim 15, further comprising storing indications of cache locations corresponding to reference data for blocks of pixels being processed in the pipeline to a plurality of registers, wherein the plurality of registers includes one or more in-flight registers that indicate cache locations for blocks of pixels at one or more upstream stages of the pipeline and an in-use register that indicates cache locations for a block of pixels currently being processed at the downstream stage of the pipeline.

18. The method as recited in claim 16, further comprising setting content of the first aging bucket to indicate the cache locations indicated by the in-flight register that are not also indicated by the one or more in-flight registers.

19. A device, comprising:
   a memory; and
   an apparatus configured to process video frames and to store the processed video frames as frame data to the memory, the apparatus comprising a block processing pipeline that implements a plurality of stages each configured to perform one or more operations on blocks of pixels from an input frame passing through the pipeline, wherein the apparatus further comprises a cache memory comprising a plurality of cache locations, each cache location configured to store a block of reference data;
   wherein the block processing pipeline is configured to:
      generate reference motion vectors for blocks of pixels from the input frame, wherein each reference motion vector indicates a block of reference data in one of a plurality of reference frames stored in the memory;
      store reference motion vectors as cache tags for the cache locations; and
      check the cache tags according to reference motion vectors to determine cache hits and cache misses for the reference motion vectors; and
      for reference motion vectors corresponding to cache misses, generate a read request according to the reference motion vector to prefetch the block of reference data indicated by the reference motion vector into a cache location determined according to a replacement policy.

20. The device as recited in claim 19, wherein the one or more reference frames are stored in the memory according to a tile format that stores reference data from processed blocks of a frame in corresponding tiles, wherein each tile includes two or more contiguous memory blocks in the memory, and wherein each reference motion vector comprises an indication of a particular one of the one or more reference frames, an indication of a particular tile in the indicated reference frame, and an indication of a particular memory block in the indicated tile.

* * * * *